(12) United States Patent
Jo et al.

(10) Patent No.: US 11,409,469 B2
(45) Date of Patent: Aug. 9, 2022

(54) STORAGE DEVICE FOR SUPPORTING MULTIPLE HOSTS AND OPERATION METHOD THEREOF

(71) Applicant: Samsung Electronics Co., Ltd., Suwon-si (KR)

(72) Inventors: Myung Hyun Jo, Hwaseong-si (KR); Youngwook Kim, Hwaseong-si (KR); Jinwoo Kim, Seoul (KR); Jaeyong Jeong, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 17/129,185

(22) Filed: Dec. 21, 2020

(65) Prior Publication Data
US 2021/0240393 A1    Aug. 5, 2021

(30) Foreign Application Priority Data
Feb. 4, 2020    (KR) .................... 10-2020-0012955

(51) Int. Cl.
*G06F 3/06* (2006.01)
*G06F 13/24* (2006.01)

(52) U.S. Cl.
CPC .......... *G06F 3/0659* (2013.01); *G06F 3/0604* (2013.01); *G06F 3/0652* (2013.01); *G06F 3/0688* (2013.01); *G06F 13/24* (2013.01)

(58) Field of Classification Search
CPC ...... G06F 3/0604; G06F 3/061; G06F 3/0652; G06F 3/0656; G06F 3/0659;
(Continued)

(56) References Cited

U.S. PATENT DOCUMENTS

| 7,263,066 B1 * | 8/2007 | Yun ................ H04L 49/106 370/429 |
| 7,414,972 B2 | 8/2008 | Grah et al. |

(Continued)

FOREIGN PATENT DOCUMENTS

| EP | 1684475 A1 | 7/2006 |
| WO | 2018175064 A1 | 9/2018 |

OTHER PUBLICATIONS

"Ethernet physical layer" Wikipedia article, available at: https://en.wikipedia.org/wiki/Ethernet_physical_layer#Physical_layers.
(Continued)

*Primary Examiner* — Larry T MacKall
(74) *Attorney, Agent, or Firm* — Muir Patent Law, PLLC

(57) ABSTRACT

An operation method of a storage device including first and second physical functions respectively corresponding to first and second hosts includes receiving performance information from each of the first and second hosts, setting a first weight value corresponding to the first physical function and a second weight value corresponding to the second physical function, based on the received performance information, selecting one of a first submission queue, a second submission queue, a third submission queue, and a fourth submission queue based on an aggregated value table, the first and second submission queues being managed by the first host and the third and fourth submission queues are managed by the second host, processing a command from the selected submission queue, and updating the aggregated value table based on a weight value corresponding to the processed command from among the first and second weights and input/output (I/O) information of the processed command.

20 Claims, 30 Drawing Sheets

(58) Field of Classification Search
CPC .. G06F 3/0679; G06F 3/0688; G06F 13/1642; G06F 13/1652; G06F 13/18; G06F 13/24; G06F 2213/0026; G11C 16/10; G11C 16/26
See application file for complete search history.

(56) References Cited

U.S. PATENT DOCUMENTS

| | | | |
|---|---|---|---|
| 7,461,159 B2 | 12/2008 | Tayyar et al. | |
| 7,929,548 B2 | 4/2011 | Goetzinger et al. | |
| 8,782,295 B2 | 7/2014 | Paragaonkar et al. | |
| 9,019,826 B2 | 4/2015 | Billaud et al. | |
| 10,061,727 B2 | 8/2018 | Canepa et al. | |
| 10,203,912 B2 | 2/2019 | Jun et al. | |
| 10,387,081 B2 | 8/2019 | Benisty | |
| 10,866,934 B1* | 12/2020 | Chen | G06F 16/1827 |
| 2006/0153071 A1 | 7/2006 | Grah et al. | |
| 2009/0003204 A1* | 1/2009 | Okholm | H04L 69/12 370/230 |
| 2011/0029695 A1* | 2/2011 | Kishore | G06F 13/4022 710/9 |
| 2018/0217951 A1 | 8/2018 | Benisty et al. | |
| 2019/0073295 A1 | 3/2019 | Lee | |
| 2020/0356396 A1* | 11/2020 | Bert | G06F 3/0607 |

OTHER PUBLICATIONS

NVM Express, Inc., Base Specification, NVM Express Revision 1.4 Jun. 10, 2019.

Ana Klimovic, Heiner Litz, Christos Kozyrakis, ReFlex: Remote Flash ≈ Local Flash. , CM SIGARCH Computer Architecture News, Mar. 2017, pp. 345-359, vol. 45, Issue.1.

* cited by examiner

FIG. 5

AVTa

| Tenant or PF | SQ | Aggregated Value for SQ (AV_SQ) | Write Weight | Read Weight | Other Weight |
|---|---|---|---|---|---|
| PF1 | SQ11 | AV_SQ11 | WW1 | RW1 | OW1 |
| | SQ12 | AV_SQ12 | | | |
| PF2 | SQ21 | AV_SQ21 | WW2 | RW2 | OW2 |
| | SQ22 | AV_SQ22 | | | |
| PF3 | SQ31 | AV_SQ31 | WW3 | RW3 | OW3 |
| | SQ32 | AV_SQ32 | | | |

FIG. 8

AVTb

| Tenant or PF | Accumulated Value for PF (AV_PF) | SQ | Accumulated Value for SQ (AV_SQ) | Write Weight | Read Weight | Other Weight |
|---|---|---|---|---|---|---|
| PF1 | AV_PF1 | SQ11 | AV_SQ11 | WW1 | RW1 | OW1 |
| | | SQ12 | AV_SQ22 | | | |
| PF2 | AV_PF2 | SQ21 | AV_SQ21 | WW2 | RW2 | OW2 |
| | | SQ22 | AV_SQ12 | | | |
| PF3 | AV_PF3 | SQ31 | AV_SQ31 | WW3 | RW3 | OW3 |
| | | SQ32 | AV_SQ32 | | | |

FIG. 14

TMT

| Tenant or PF | Token Unit | Time | # of Token |
|---|---|---|---|
| PF1 | TKU1 | T1 | a |
| PF2 | TKU2 | T2 | b |
| PF3 | TKU3 | T3 | c |

FIG. 18

| Tenant or PF | Minimum Performmance ||||  Maximum Performance ||||
|---|---|---|---|---|---|---|---|---|
| | Seq.Write Bandwidth | Seq.Read Bandwidth | Ran.Write IOPS | Ran.Read IOPS | Seq.Write Bandwidth | Seq.Read Bandwidth | Ran.Write IOPS | Ran.Read IOPS |
| PF1 | SW_min1 | SR_min1 | RW_min1 | RR_min1 | SW_max1 | SR_max1 | RW_max1 | RR_max1 |
| PF2 | SW_min2 | SR_min2 | RW_min2 | RR_min2 | SW_max2 | SR_max2 | RW_max2 | RR_max2 |
| PF3 | SW_min3 | SR_min3 | RW_min3 | RR_min3 | SW_max3 | SR_max3 | RW_max3 | RR_max3 |

STORAGE DEVICE FOR SUPPORTING MULTIPLE HOSTS AND OPERATION METHOD THEREOF

CROSS-REFERENCE TO RELATED APPLICATIONS

This application claims priority under 35 U.S.C. § 119 to Korean Patent Application No. 10-2020-0012955 filed on Feb. 4, 2020, in the Korean Intellectual Property Office, the disclosures of which are incorporated by reference herein in their entireties.

BACKGROUND

Embodiments of the inventive concept described herein relate to a storage device, and more particularly, relate to a storage device configured to support multiple hosts and an operation method thereof.

A semiconductor memory device is classified as a volatile memory device, in which stored data disappear when a power is turned off, such as a static random access memory (SRAM) or a dynamic random access memory (DRAM), or a nonvolatile memory device, in which stored data are retained even when a power is turned off, such as a flash memory device, a phase-change RAM (PRAM), a magnetic RAM (MRAM), a resistive RAM (RRAM), or a ferroelectric RAM (FRAM).

Flash memory based high-capacity storage media communicate with an external device by using a high-speed interface. Nowadays, a multi-host storage system in which a single storage medium supports a plurality of hosts or a plurality of tenants is being developed. In general, in the case where a plurality of hosts access a single storage medium, the performance of each of the plurality of hosts is reduced due to a limited physical resource of the single storage medium.

SUMMARY

Embodiments of the inventive concept provide a storage device capable of improving overall performance of a storage system by securing minimum performance for each of a plurality of hosts and an operation method thereof.

According to an exemplary embodiment, an operation method of a storage device which includes a first physical function and a second physical function respectively corresponding to a first host and a second host includes receiving first performance information and second performance information from the first host and the second host, respectively, setting first weight information corresponding to the first physical function and second weight information corresponding to the second physical function, based on the first performance information and the second performance information, respectively, selecting a submission queue from a plurality of submission queues based on an aggregated value table, a first group of submission queues among the plurality of submission queues and a second group of submission queues among the plurality of submission queues being managed by the first host and the second host, respectively, and the first group of submission queues and the second group of submission queues being accessed by the first physical function and the second physical function, respectively, performing a memory operation corresponding to a command fetched from the submission queue, selected from the plurality of submission queues, using one of the first physical function and the second physical function which accessed the submission queue among the plurality of submission queues, and updating an entry of the aggregated value table based on weight information, among the first weight information and the second weight information, corresponding to the one of the first physical function and the second physical function which performed the memory operation and input/output (I/O) information processed by the command.

According to an exemplary embodiment of the present inventive concept, a storage device includes a nonvolatile memory device, and a storage controller connected to a host including a first host and a second host and configured to control the nonvolatile memory device. The storage controller includes a first NVMe controller configured to process a first command from a first group of submission queues of the first host, a second NVMe controller configured to process a second command from a second group of submission queues of the second host, and a performance manager configured to set a first weight value and a second weight value respectively associated with the first NVMe controller and the second NVMe controller based on first performance information received from the first and second performance information received from the second host, select a submission queue of a plurality of submission queues including the first group of submission queues and the second group of submission queues based on an aggregated value table including a plurality of entries, each of the plurality of entries being associated with a corresponding submission queue of the plurality of submission queues and updated based on a weight value of the corresponding submission queue and input/output (I/O) information processed by a command previously fetched from the corresponding submission queue, and process a command from the submission queue selected from the plurality of submission queues.

According to an exemplary embodiment of the present inventive concept, an operation method of a storage device which is configured to communicate with a plurality of hosts includes receiving a plurality of performance information from the plurality of hosts, setting a weight value of each of the plurality of hosts based on respective performance information of the plurality of performance information, fetching a command from a first host of the plurality of hosts, based on an aggregated value table, processing the fetched command, and updating the aggregated value table based on input/output (I/O) information of the processed command and a weight value of the first host. The aggregated value table includes a plurality of aggregated values, and each of the plurality of aggregated values was previously updated by a product of I/O information of a previously processed command and a weight value of a host, from which the previously processed command was fetched, of the plurality of hosts.

According to an exemplary embodiment of the present inventive concept, an operation method of a storage device which includes a first physical function corresponding to a first host includes fetching a first command from a first submission queue corresponding to the first physical function, completing an operation associated with the fetched first command, determining whether a token corresponding to the first physical function exists, based on a token management table including information about a number of tokens corresponding to the first physical function, and transmitting an input/output completion to the first host when the token corresponding to the first physical function exists and delaying, until a timer expires, transmitting the input/output completion to the first host when the token corresponding to the first physical function does not exist.

BRIEF DESCRIPTION OF THE FIGURES

The above and other objects and features of the inventive concept will become apparent by describing in detail exemplary embodiments thereof with reference to the accompanying drawings.

FIG. 5 is a diagram illustrating an aggregated value table of FIG. 2.

FIG. 8 is a diagram illustrating an aggregated value table of FIG. 2.

FIG. 14 is a diagram illustrating a token management table of FIG. 13.

FIG. 18 is a diagram for describing a configuration to receive performance information of FIG. 4.

DETAILED DESCRIPTION

Below, embodiments of the inventive concept may be described in detail and clearly to such an extent that an ordinary one in the art implements the inventive concept.

Figure 1:
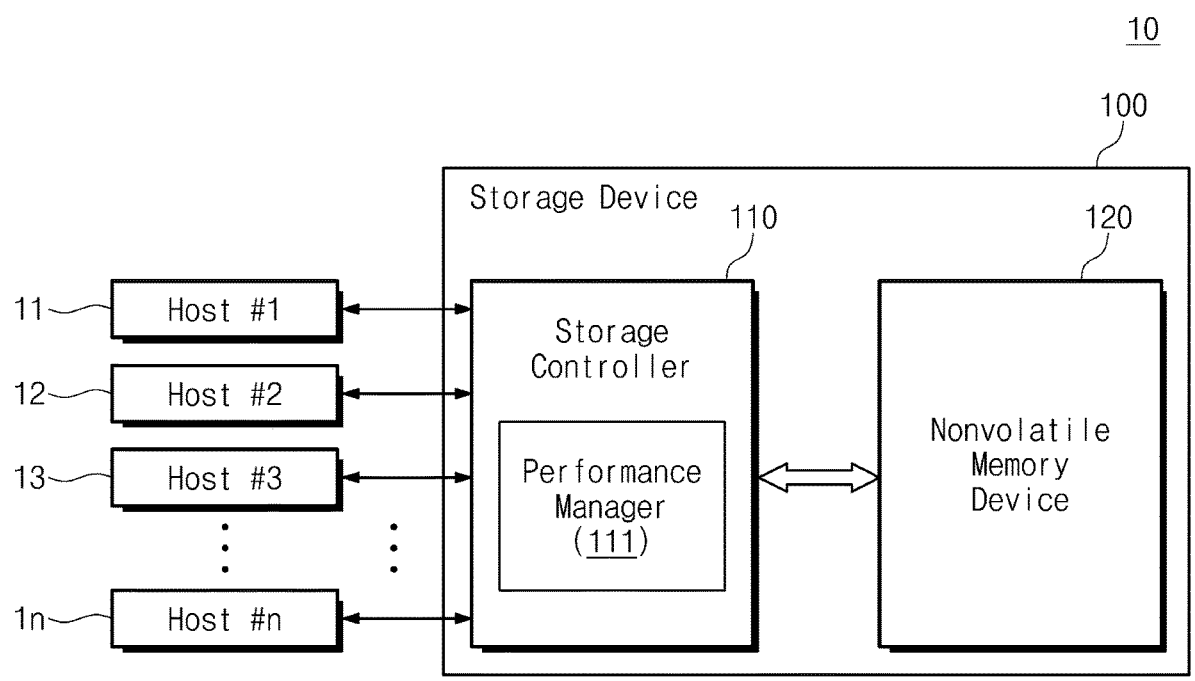
FIG. 1 is a block diagram illustrating a storage system according to an embodiment of the inventive concept.

FIG. 1 is a block diagram illustrating a storage system according to an embodiment of the inventive concept. Referring to FIG. 1, a storage system 10 may include a plurality of hosts 11 to 1n and a storage device 100. In an embodiment, the storage system 10 may include at least one of various information processing devices such as a personal computer, a laptop computer, a server, a workstation, a smartphone, and a tablet PC.

Each of the plurality of hosts 11 to 1n may be configured to access the storage device 100. In an exemplary embodiment, the plurality of hosts 11 to 1n may be different computing nodes configured to operate independently of each other. In an exemplary embodiment, each of the plurality of hosts 11 to 1n may be a single processor or a multi-core processor included in the corresponding computing node (or computing system). Alternatively, at least some of the plurality of hosts 11 to 1n may be different processors included in the same computing node (or computing system). Alternatively, the plurality of hosts 11 to 1n may be processes configured to process different applications. Alternatively, the plurality of hosts 11 to 1n may be virtual machines running on a computing node.

The storage device 100 may operate under control of each of the plurality of hosts 11 to 1n. For example, the storage device 100 may include a storage controller 110 and a nonvolatile memory device 120. Under control of each of the plurality of hosts 11 to 1n, the storage controller 110 may store data in the nonvolatile memory device 120 or may provide data stored in the nonvolatile memory device 120 to each of the plurality of hosts 11 to 1n. In an exemplary embodiment, the plurality of hosts 11 to 1n and the storage device 100 may communicate with each other based on a PCI-express (Peripheral Component Interconnect express) interface or a PCI-express based NVMe (Nonvolatile Memory Express) interface. An interface between the plurality of hosts 11 to 1n and the storage device 100 and a structural characteristic of the interface will be described with reference to drawings below.

In an exemplary embodiment, the storage device 100 may be a storage device or a single storage device configured to support a multi-host or a multi-tenant. Each of the plurality of hosts 11 to 1n configured to access the storage device 100 independently of each other may require specific performance depending on a type or an operation manner for the purpose of accessing the storage device 100. However, due to a limitation on a physical resource of the storage device 100, the storage device 100 may fail to support the specific performance of each of the plurality of hosts 11 to 1n, under a specific condition (e.g., in the case where a specific host occupies all or most of the physical resource of the storage device 100).

The storage device 100 according to an embodiment of the inventive concept may provide minimum performance with each of the plurality of hosts 11 to 1n. For example, the storage controller 110 of the storage device 100 may include a performance manager 111. The performance manager 111 may set a weight (i.e., a weight value) of a physical function or a submission queue corresponding to each of the plurality of hosts 11 to 1n and may manage an aggregated value AV based on the set weight or processed I/O information. The performance manager 111 may schedule a command from each of the plurality of hosts 11 to 1n based on the aggregated value AV. A configuration and an operation of the performance manager 111 will be more fully described with reference to drawings below.

Figure 2:
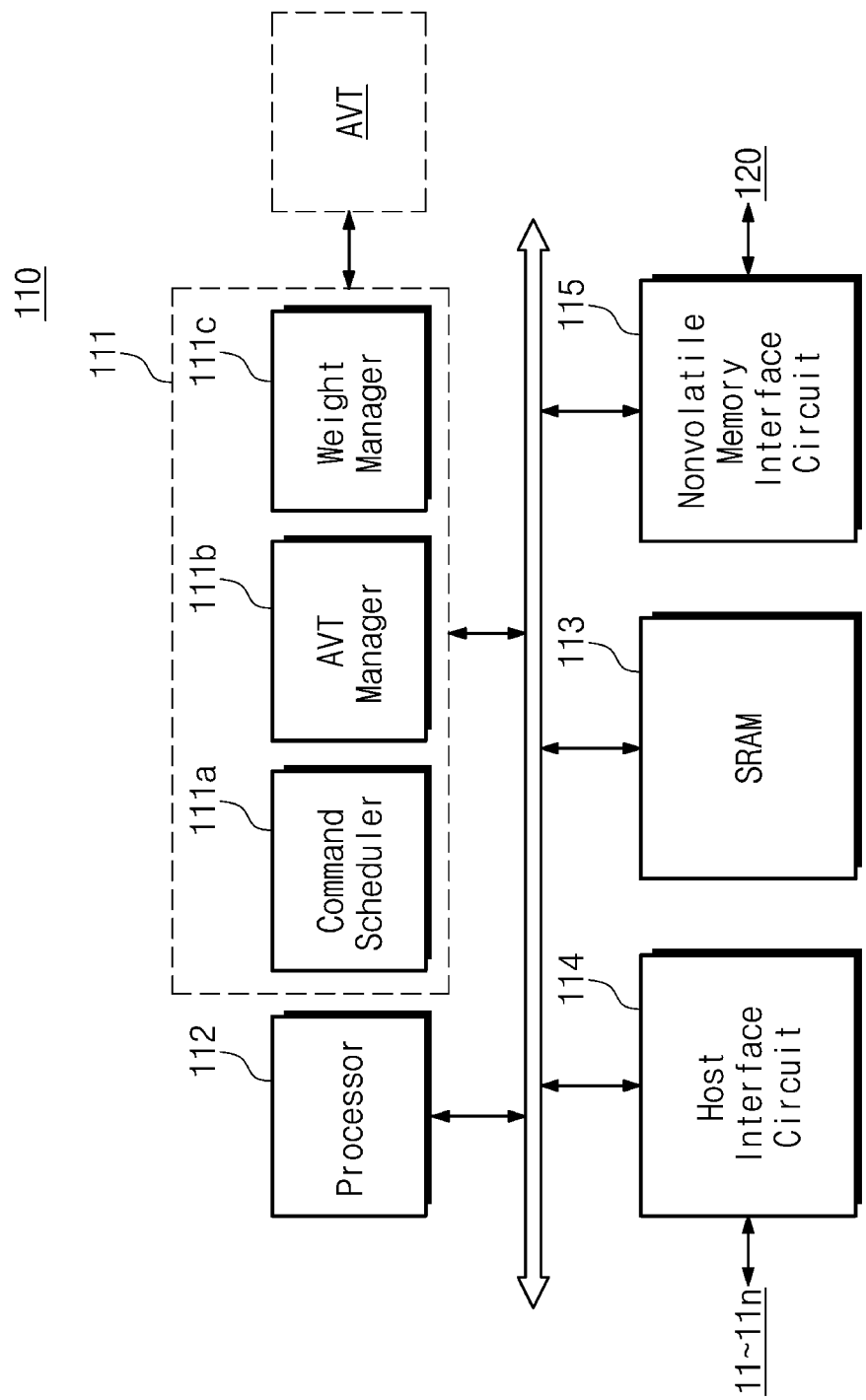
FIG. 2 is a block diagram illustrating a storage controller of FIG. 1.

FIG. 2 is a block diagram illustrating a storage controller of FIG. 1. Referring to FIGS. 1 and 2, the storage controller 110 may include the performance manager 111, a processor 112, an SRAM 113, a host interface circuit 114, and a nonvolatile memory interface circuit 115.

The performance manager 111 may be configured to manage the performance of each of the plurality of hosts 11 to 1n by scheduling commands of the plurality of hosts 11 to 1n. For example, the performance manager 111 may include a command scheduler 111a, an aggregated value table manager 111b, and a weight manager 111c.

The command scheduler 111a may be configured to schedule commands from the plurality of hosts 11 to 1n. For example, the command scheduler 111a may select a submission queue corresponding to each of the plurality of hosts 11 to 1n based on an aggregated value table AVT managed by the aggregated value table manager 111b and may process a command from the selected submission queue. In an exemplary embodiment, the command scheduler 111a may be configured to select a submission queue or a physical function corresponding to a relatively small aggregated value or the lowest aggregated value. For example, a command stored in the submission queue associated with the physical function corresponding to a relatively small aggregated value or the lowest aggregate value may be prioritized.

The aggregated value table manager 111b may be configured to manage the aggregated value table AVT. The aggregated value table AVT may include an aggregated value of a physical function PF or submission queues SQ corresponding to each of the plurality of hosts 11 to 1n. An aggregated value may indicate a value that is obtained by aggregating a weight managed by the weight manager 111c or processed I/O information. That is, assuming that weights of first and second submission queues are identical, in the case where the number of commands processed with regard to the first submission queue is more than the number of commands processed with regard to the second submission queue, an aggregated value corresponding to the first submission queue may be greater than an aggregated value corresponding to the second submission queue. Alternatively, even though the number of commands processed with regard to the first submission queue is more than the number of commands processed with regard to the second submission queue, a relationship between aggregated values of the first and second submission queues may be interchanged depending on weights of the first and second weights.

As described above, as the command scheduler 111a selects a submission queue or a physical function corresponding to a relatively small aggregated value or the lowest aggregated value, commands of a host that is serviced at a relatively small frequency may be processed. In this case, the overall performance of the plurality of hosts 11 to 1n may become uniform, or minimum performance of each of the plurality of hosts 11 to 1n may be secured.

The weight manager 111c may be configured to manage a weight necessary to generate the aggregated value AV managed by the aggregated value table manager 111b. For example, the storage device 100 may receive performance information (e.g., bandwidth) from each of the plurality of hosts 11 to 1n in an initialization operation. The performance information may include information of minimum performance of each of the plurality of hosts 11 to 1n. The weight manager 111c may set a weight of the physical function PF or the submission queue SQ corresponding to each of the plurality of hosts 11 to 1n, based on information about the minimum performance of each of the plurality of hosts 11 to 1n. In an embodiment, a weight associated with one physical function PF or one submission queue SQ may include a read weight associated with a read operation, a write weight associated with a write operation, or an additional weight associated with an additional operation (e.g., a garbage collection operation). The above operation of the performance manager 111 will be more fully described with reference to drawings below.

In an exemplary embodiment, the above physical function PF may be a hardware or software component configured to provide a function defined by the NVMe interface standard. Alternatively, the physical function PF may be an NVMe controller configured to support a single PCI-express function. Alternatively, the physical function PF may be a PCI-express function supporting a single root I/O virtualization (SR-IOV) function configured to allow the physical function PF to support one or more dependent virtual function. Below, it is assumed that the physical function PF is an NVMe controller corresponding to at least one of the plurality of hosts 11 to 1n. A configuration of the physical function PF will be more fully described with reference to FIGS. 3A to 3C.

The processor 112 may control overall operations of the storage controller 110. For example, the processor 112 may be configured to execute various applications (e.g., a flash translation layer (FTL)) on the storage controller 110. The SRAM 113 may be used as a buffer memory, a working memory, or a cache memory of the storage controller 110. In an exemplary embodiment, the performance manager 111 may be implemented in the form of software, hardware, or a combination thereof. In the case where the performance manager 111 is implemented in the form of software, information associated with the performance manager 111 may be stored in the SRAM 113, and the performance manager 111 stored in the SRAM 113 may be executed by the processor 112.

The host interface circuit 114 may communicate with the plurality of hosts 11 to 1n in compliance with a given communication protocol. In an exemplary embodiment, the given interface protocol may include at least one of various host interfaces such as a PCI-express (Peripheral Component Interconnect express) interface, an NVMe (nonvolatile memory express) interface, a SATA (Serial ATA) interface, a SAS (Serial Attached SCSI) interface, and a UFS (Universal Flash Storage) interface, but the inventive concept is not limited thereto. To describe the technical idea of the inventive concept, below, it is assumed that the host interface circuit 114 is implemented on an NVMe interface basis. That is, the host interface circuit 114 may communicate with each of the plurality of hosts 11 to 1n through a PCI-express interface based physical layer and may process information received from the plurality of hosts 11 to 1n through the NVMe interface based NVMe controller. In an exemplary embodiment, the NVMe controller may be included in the host interface circuit 114, and the NVMe controller may correspond to the plurality of hosts 11 to 1n. In an exemplary embodiment, the NVMe controller may be a physical NVMe controller, and a plurality of virtual NVMe controller may be created and may be running on the physical NVMe controller. In this case, each of the plurality of virtual NVMe controller may be associated with a corresponding host of the plurality of hosts 11 to 1n.

In an exemplary embodiment, in the case where the performance manager 111 is implemented in the form of hardware, the performance manager 111 may be included in the host interface circuit 114 or may be included in an NVMe controller of the host interface circuit 114.

The storage controller 110 may communicate with the nonvolatile memory device 120 through the nonvolatile memory interface circuit 115. In an exemplary embodiment, the nonvolatile memory interface circuit 115 may be a NAND interface, and the NAND interface may support a multi-way/multi-channel of a plurality of nonvolatile memories included in the nonvolatile memory device 120.

Figure 3A:
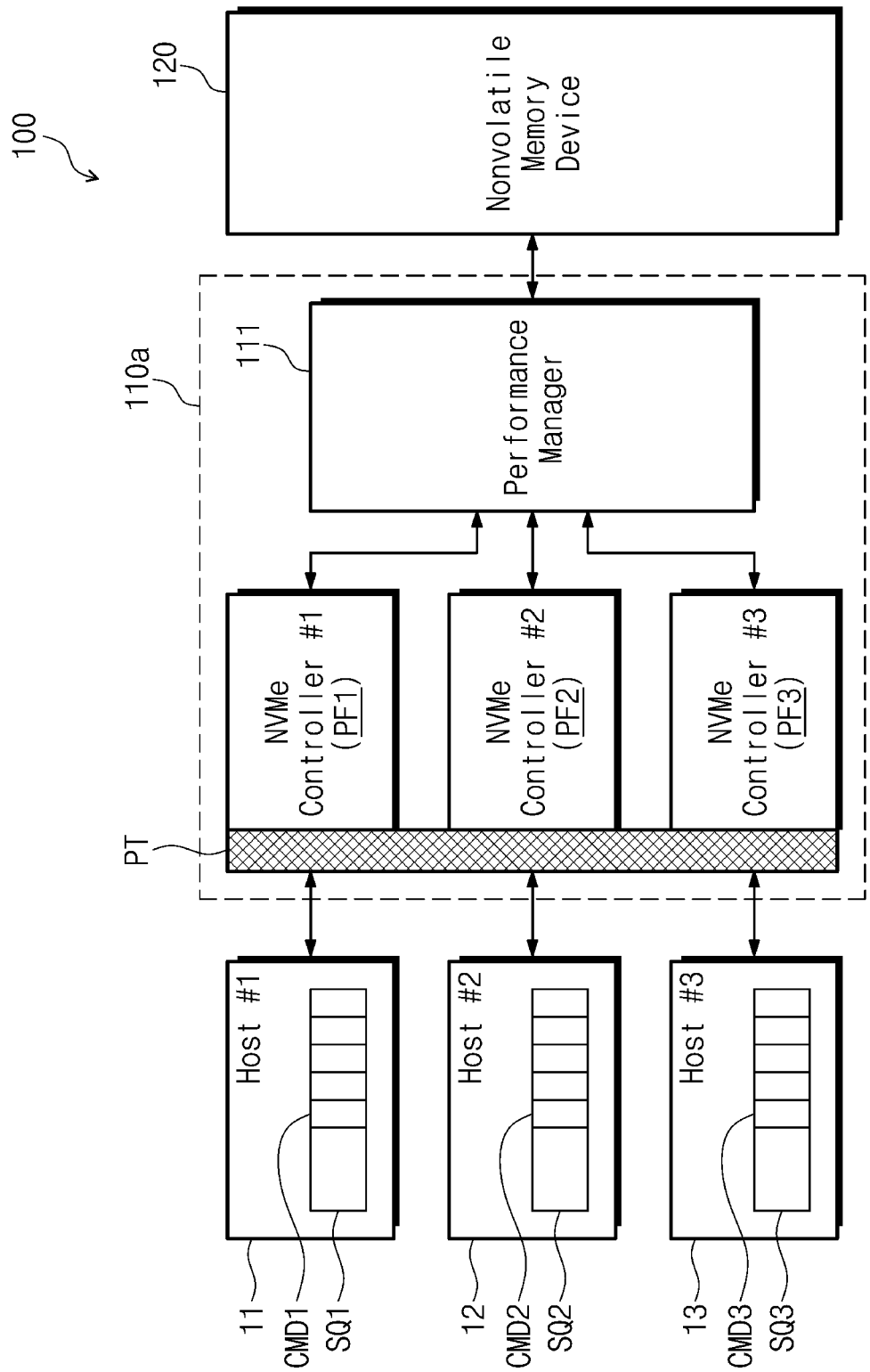
FIGS. 3A to 3C are diagrams for describing a physical function of a storage device of FIG. 1.
Figure 3B:
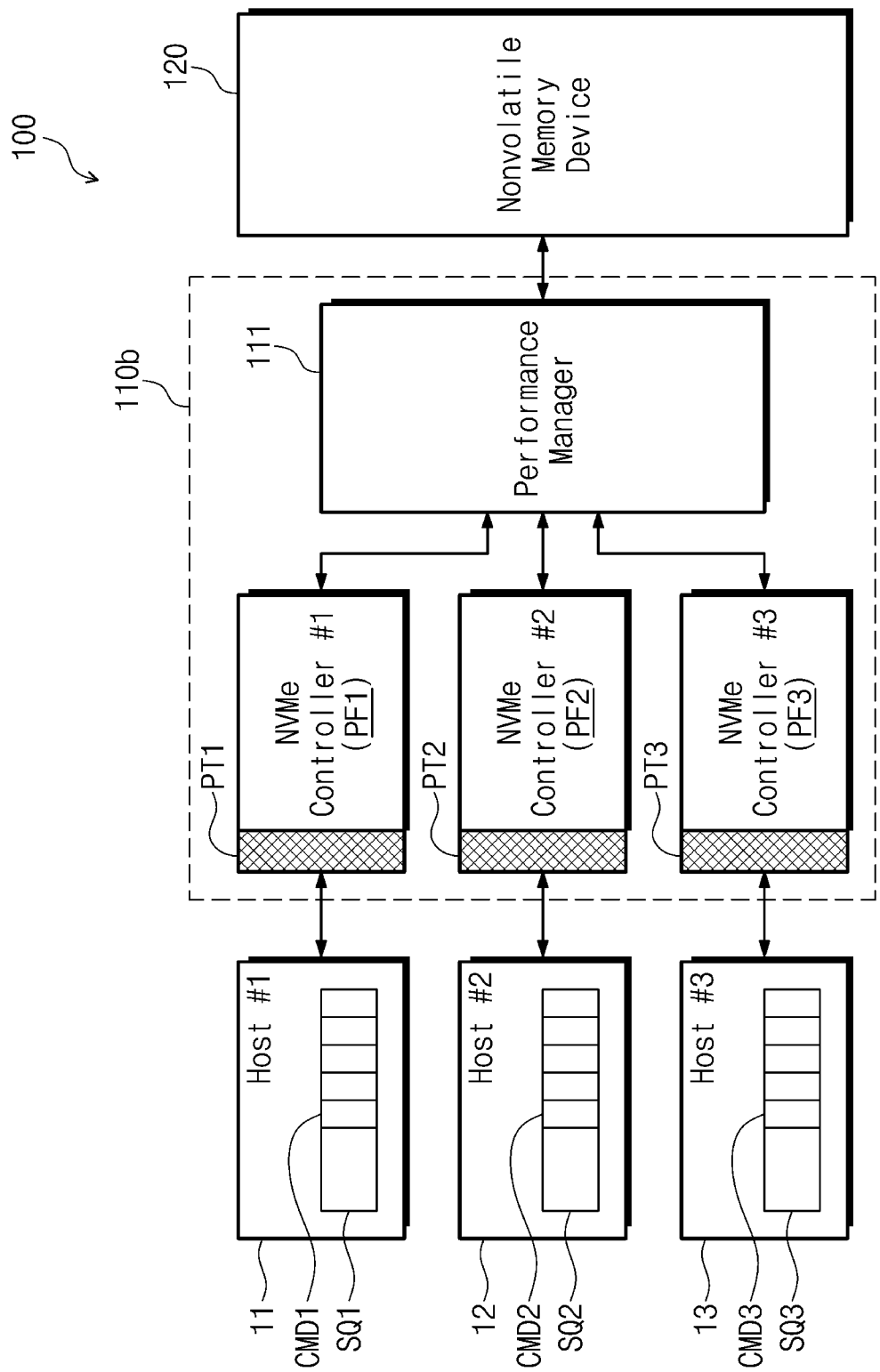
Figure 3C:
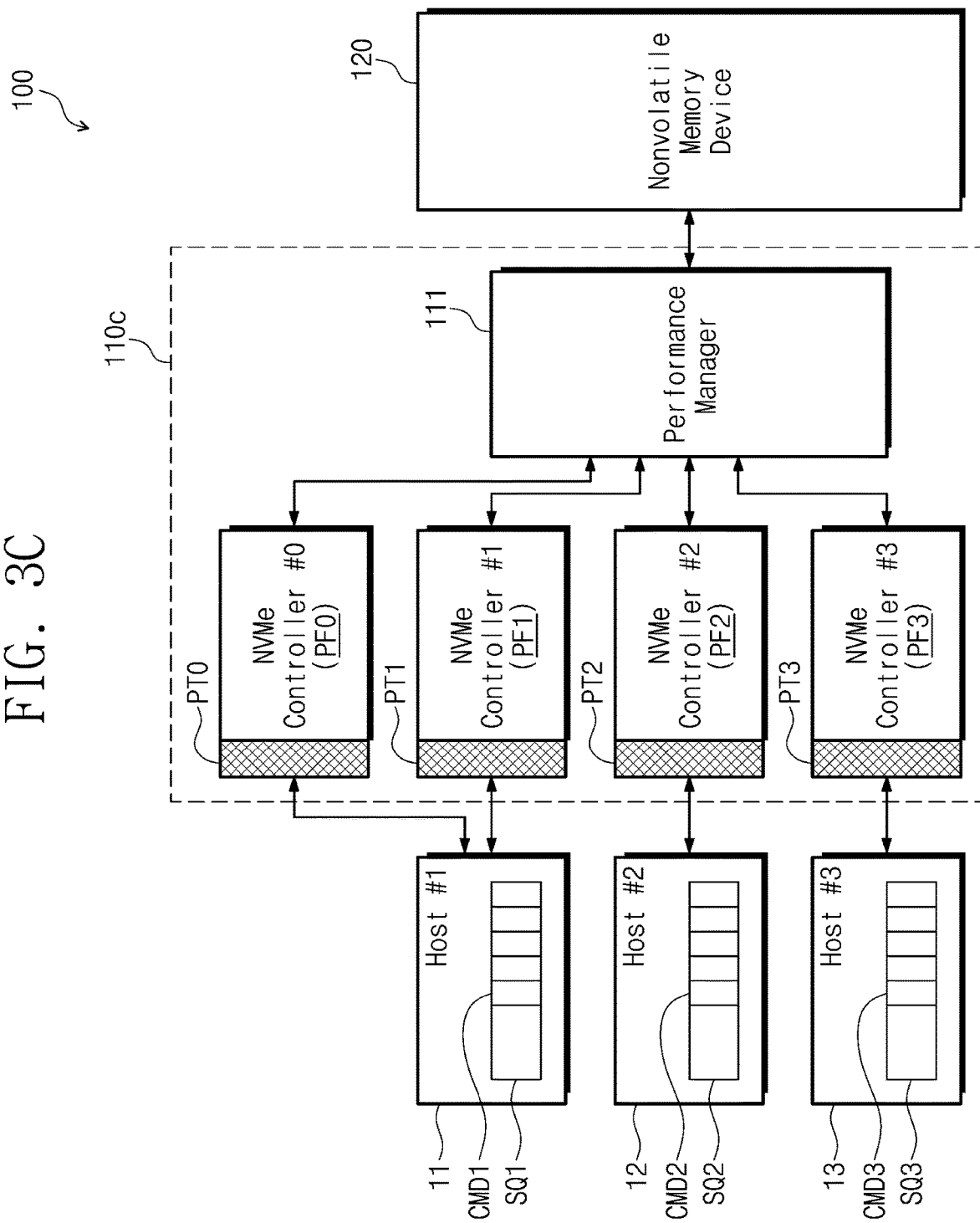

FIGS. 3A to 3C are diagrams for describing a physical function of a storage device of FIG. 1. For brevity of illustration and convenience of description, below, components that are unnecessary to describe a configuration, a structure, and a function of the physical function PF will be omitted.

Below, the term "physical function PF" is used to describe the technical idea of the inventive concept. The physical function PF may refer to an NVMe controller corresponding to each of the plurality of hosts 11 to 1n. When the NVMe controller is a physical NVMe controller, a plurality of virtual NVMe controller may be running on the physical NVMe controller, and the physical function PF may refer to a virtual NVMe controller running on the physical NVMe controller. Also, for convenience of description, the term "physical function PF" may be used, but the physical function PF may be interchangeable with a configuration or a term of the NVMe controller (or the virtual NVMe controller). The NVMe controller may be implemented in the form of software, hardware, or a combination thereof. Alternatively, the physical function PF may indicate a PCI-express configured to support the SR-IOV function. The SR-IOV may indicate a function that allows one physical function to support one or more dependent virtualization functions. That is, below, the physical function PF may correspond to at least one of the plurality of hosts 11 to 1n and may be understood as being configured to process a command of the corresponding host of the plurality of hosts 11 to 1n or a command of a submission queue managed by the corresponding host. For convenience of description, below, it is assumed that the storage device 100 communicates with three hosts 11, 12, and 13, but the inventive concept is not limited thereto.

Referring to FIGS. 1 to 3C, the first to third hosts 11 to 13 may issue commands CMD1 to CMD3 for processing corresponding operations, respectively. For example, the first host 11 may issue the first command CMD1, and the first command CMD1 thus issued may be queued in a first submission queue SQ1. The second host 12 may issue the second command CMD2, and the second command CMD2 thus issued may be queued in a second submission queue SQ2. The third host 13 may issue the third command CMD3, and the third command CMD3 thus issued may be queued in a third submission queue SQ3.

An exemplary embodiment is illustrated in FIG. 3A as each of the first to third hosts 11 to 13 manages one submission queue, but the inventive concept is not limited thereto. For example, each of the first to third hosts 11 to 13 may manage a plurality of submission queues. Alternatively, each of the first to third hosts 11 to 13 may further manage a completion queue configured to receive completions associated with a plurality of submission queues. Alternatively, each of the first to third hosts 11 to 13 may issue an administrative command and may further manage an administration queue and an administration completion queue configured to receive a completion associated with an administrative command. In an exemplary embodiment, the submission queue, the completion queue, the administration queue, the administration completion queue, etc. may be included in a controller memory buffer (CMB) (e.g., the SRAM 113 or a separate memory buffer (not illustrated)) of the storage device 100. Alternatively, the submission queue, the completion queue, the administration queue, the administration completion queue, etc. may be included in a host memory buffer (HMB) of a corresponding host.

The storage device 100 may communicate with the first to third hosts 11 to 13. In an exemplary embodiment, the storage device 100 may communicate with the first to third hosts 11 to 13 through an interface (e.g., NVMe over PCI-express) based on a physical layer of the PCI-express interface. Alternatively, the storage device 100 may communicate with the first to third hosts 11 to 13 through a network based interface (e.g., NVMe-oF: NVMe over Fabrics) such as a fibre channel or a remote direct random access memory (RDMA). Below, to describe an embodiment of the inventive concept clearly, it is assumed that the storage controller 110 communicates with the first to third hosts 11 to 13 through the NVMe over PCI-express interface.

The storage device 100 may communicate with the first to third hosts 11 to 13 through various types of physical layers. First to third physical functions PF1 to PF3 may respectively correspond to the first to third hosts 11 to 13. For example, the first physical function PF1 may indicate a first NVMe controller configured to communicate with the first host 11 and to process the first command CMD1 from the first host 11. The second physical function PF2 may indicate a second NVMe controller configured to communicate with the second host 12 and to process the second command CMD2 from the second host 12. The third physical function PF3 may indicate a third NVMe controller configured to communicate with the third host 13 and to process the third command CMD3 from the third host 13.

Each of the first to third physical functions PF1 to PF3 may perform an operation of the nonvolatile memory device 120 based on a command from the corresponding host. In an exemplary embodiment, the nonvolatile memory device 120 may be managed by using a logically divided namespace NS or a physically or logically divided nonvolatile memory (NVM) set. Each of the first to third physical functions PF1 to PF3 may perform an operation corresponding to a command with respect to a corresponding namespace or a corresponding NVM set.

The performance manager 111 may control operations of the first to third physical functions PF1 to PF3 based on the aggregated value table. For example, the performance manager 111 may schedule physical functions, which will process a command, from among the first to third physical functions PF1 to PF3 based on the aggregated value table.

In an exemplary embodiment, as illustrated in FIG. 3A, the first to third physical functions PF1 to PF3 may communicate with the first to third hosts 11 to 13 through one physical port PT. A storage controller 110a may include one physical port PT, the first to third physical functions PF1 to PF3, and the performance manager 111. The first to third physical functions PF1 to PF3 may communicate with the first to third hosts 11 to 13 through one physical port PT. The physical port PT may be a physical layer configured to support the PCI-express interface. In an exemplary embodiment, each of the first to third physical functions PF1 to PF3 may support dependent virtual functions. In an exemplary embodiment, at least one of the first to third physical functions PF1 to PF3 may be a dependent virtual function.

Alternatively, as illustrated in FIG. 3B, the first to third physical functions PF1 to PF3 may communicate with the first to third hosts 11 to 13 through a plurality of physical ports PT1 to PT3. For example, as illustrated in FIG. 3B, a storage controller 110b may include the first to third physical ports PT1 to PT3, the first to third physical functions PF1 to PF3, and the performance manager 111. Each of the first to third physical ports PT1 to PT3 may be an independent physical layer configured to support the PCI-express interface. The first physical function PF1 may communicate with the first host 11 through the first physical port PT1, the second physical function PF2 may communicate with the second host 12 through the second physical port PT2, and the third physical function PF3 may communicate with the third host 13 through the third physical port PT3.

In an exemplary embodiment, as illustrated in FIG. 3C, at least one host (e.g., the first host 11) of the first to third hosts 11 to 13 may communicate with at least two physical functions. For example, as illustrated in FIG. 3C, a storage controller 110c may include 0-th to third physical ports PT0 to PT3, 0-th to third physical functions PF0 to PF3, and the performance manager 111. The first host 11 may communicate with the 0-th physical port PT0 through the 0-th physical port PT0 and may communicate with the first physical port PT1 through the first physical port PT1. That is, one host may communicate with at least two physical functions.

In an exemplary embodiment, first to third NVMe controllers corresponding to the first to third physical functions PF1 to PF3, and the physical ports PT1, PT2, and PT3 may be included in the host interface circuit 114 or may be implemented on the host interface circuit 114.

The communication between the storage device 100 and the hosts 11 to 13 and the configuration of the physical function PF, which are described with reference to FIGS. 3A to 3C, are exemplary, and the inventive concept is not limited thereto. As described above, a plurality of physical functions PF may indicate NVMe controllers respectively corresponding to a plurality of hosts, and the plurality of physical functions PF may be configured to communicate with the corresponding hosts through one physical port or through individual physical ports. That is, below, it may be understood that one physical function PF corresponds to one host.

Figure 4:
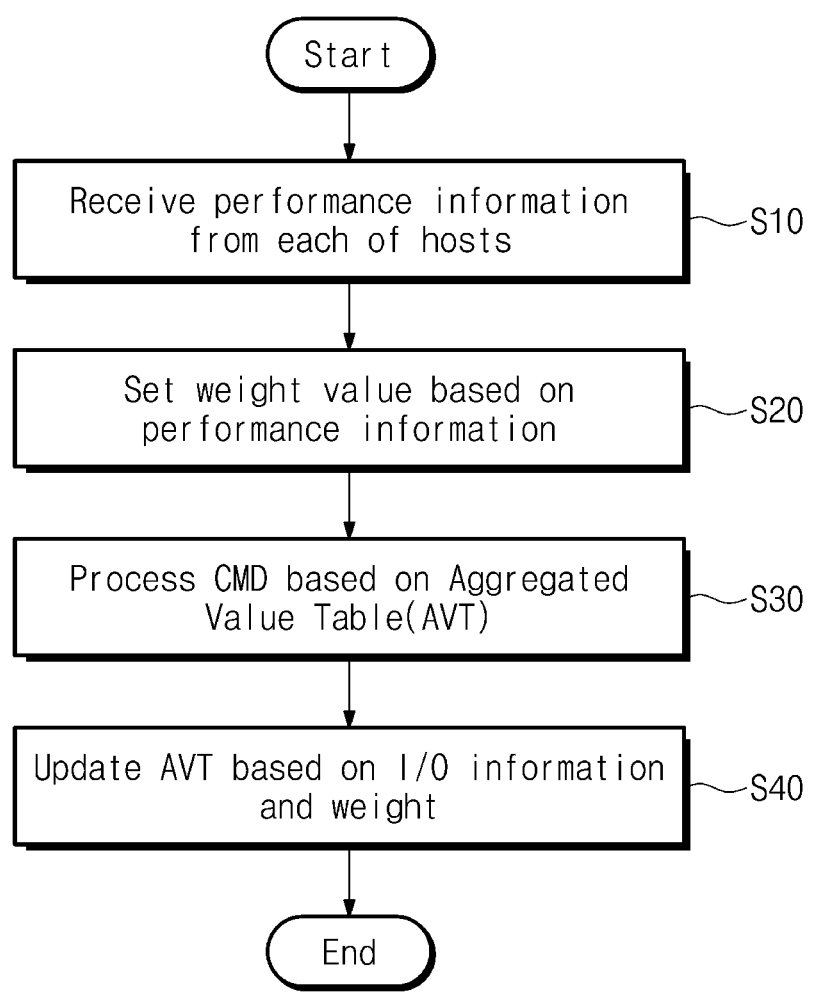
FIG. 4 is a flowchart illustrating an operation of a storage device of FIG. 1.

FIG. 4 is a flowchart illustrating an operation of a storage device of FIG. 1. Below, for convenience of description, a description will be given as one host manages two submission queues. For example, it is assumed that the first physical function PF1 corresponds to the first host 11 and the first host 11 manages two submission queues SQ11 and SQ12. In this case, the first physical function PF1 may be configured to process the commands CMD from the two submission queues SQ11 and SQ12. However, the inventive concept is not limited thereto. For example, one host may further manage a plurality of submission queues or any other command queues, and one physical function PF may be configured to process commands associated with the plurality of submission queues.

Below, for convenience of description, the expression "the submission queue of the physical function" is used. The submission queue of the physical function may mean a submission queue that is managed by a host corresponding to the physical function.

Below, for convenience of description, it is assumed that the storage device 100 communicates with the first to third hosts 11 to 13 and the first to third hosts 11 to 13 correspond to the first to third physical functions PF1 to PF3, respectively. The first to third physical functions PF1 to PF3 are described with reference to FIGS. 3A to 3C, and thus, a detailed description thereof will not be repeated here. The above description is given only to describe an embodiment of the inventive concept, and the inventive concept is not limited thereto.

Referring to FIGS. 1, 2, 3A, and 4, in operation S10, the storage device 100 may receive performance information from the first to third hosts 11 to 13, respectively. For example, each of the first to third hosts 11 to 13 may be a computing node, a processor, or an application (or a process), which is driven independently. In this case, each of the first to third hosts 11 to 13 may require performance of a given level depending on a scheme to drive or an application to be driven. The storage device 100 may receive the performance information from the first to third hosts 11 to 13, respectively.

In an exemplary embodiment, the performance information may include information about minimum performance and maximum performance of each of the first to third hosts 11 to 13. The minimum performance may indicate information about minimum performance that each of the first to third hosts 11 to 13 requires, and the maximum performance may indicate maximum performance or restrictive maximum performance that each of the first to third hosts 11 to 13 requires. The storage device 100 according to an embodiment of the inventive concept may provide each of the first to third hosts 11 to 13 with performance that is the minimum performance or higher and is the maximum performance or lower.

In an exemplary embodiment, the performance information of each of the first to third hosts 11 to 13 may be received upon initializing the storage device 100 or communicating with the storage device 100 for the first time.

In operation S20, the storage device 100 may set a weight value WV based on the performance information. For example, the performance manager 111 (in particular, the weight manager 111c) of the storage controller 110 may set the weight value WV of each of the first to third physical functions PF1 to PF3 based on the performance information of each of the first to third hosts 11 to 13 or information about the minimum performance included in the performance information. For example, when the minimum performance of each of the first to third hosts 11 to 13 are 1 GB/s, 2 GB/s, and 3 GB/s, a ratio of the weight values WV of the first to third physical functions PF1 to PF3 may be 3:2:1 or 6:3:2. In an exemplary embodiment, the weight value WV set in operation S20 may be a weight that is used to aggregate information of inputs/outputs performed by commands from a host, and weight values associated with a maintenance operation that is performed in the storage device 100 may be different.

In operation S30, the storage device 100 may process a command based on the aggregated value table AVT. For example, the performance manager 111 (in particular, the command scheduler 111a) of the storage controller 110 may select a physical function or a submission queue having the lowest aggregated value of the aggregated value table AVT. The performance manager 111 may fetch a command from a submission queue corresponding to the selected physical function or from the selected submission queue. In an exemplary embodiment, the fetched command may be processed by any other component (e.g., the processor 112 or the nonvolatile memory interface circuit 115) of the storage controller 110.

In operation S40, the storage device 100 may update the aggregated value table AVT based on the set weight value and I/O information about the processed command. For example, the performance manager 111 (in particular, the aggregated value table manager 111b) may update a corresponding entry of the aggregated value table AVT, based on a product of the I/O information about the processed command and the corresponding weight value. In an exemplary embodiment, the I/O information may indicate an I/O size (i.e., a size of input/output data) corresponding to the processed command.

A method of selecting the physical function PF or the submission queue SQ based on the aggregated value table AVT and a method of updating the aggregated value table AVT will be more fully described with reference to drawings below.

As described above, the storage device 100 according to an embodiment of the inventive concept may manage aggregated values of a plurality of physical functions PF or a plurality of submission queues SQ by using the aggregated value table AVT. The storage device 100 may select the physical function PF or the submission queue SQ corresponding to the lowest aggregated value based on the aggregated value table AVT and may process or schedule a command based on the selected physical function or submission queue. Accordingly, because a command of a host serviced at a relatively small ratio (in this case, a ratio to which information about minimum performance of each host is applied) is preferentially processed, uniform performance may be provided to each host, or the minimum performance of each host may be secured. Also, a specific situation in which a specific host occupies all or most of the physical resource of the storage device 100 may be prevented.

FIG. 5 is a diagram illustrating an aggregated value table of FIG. 2. For brevity of illustration and convenience of description, a data structure of the aggregated value table AVT will be briefly described, but the inventive concept is not limited thereto. Referring to FIGS. 1, 2, 3A, and 5, an aggregated value table AVTa may include identifier information about the physical function PF, identifier information about the submission queue SQ, aggregated value information about the submission queue SQ, and a plurality of weight information (e.g., a write weight, a read weight, and any other weight).

That is, in the case where the storage device 100 communicates with the first to third hosts 11 to 13 and the first to third hosts 11 to 13 manage pairs of submission queues SQ11 and SQ12, SQ21 and SQ22, and SQ31 and SQ32, respectively, the aggregated value table AVTa may include information about the first physical function PF1 corresponding to the first host 11, information about the two submission queues SQ11 and SQ12 corresponding to the first physical function PF1, aggregated value information AV_SQ11 and AV_SQ12 respectively corresponding to the two submission queues SQ11 and SQ12, and weight information WW1, RW1, and OW1 corresponding to the first physical function PF1. The aggregated value table AVTa may further include information on the second physical function PF2 and the third physical function PF3, and information SQ21 and SQ22, AV_SQ21 and AV_SQ22, and WW2, RW2, and OW2 corresponding to the second physical function PF2 and information SQ31 and SQ32, AV_SQ31 and AV_SQ32, and WW3, RW3, and OW3 corresponding to the third physical function PF3. The information about the second and third physical functions PF2 and PF3 is described above, and thus, additional description will be omitted to avoid redundancy.

Figure 6:
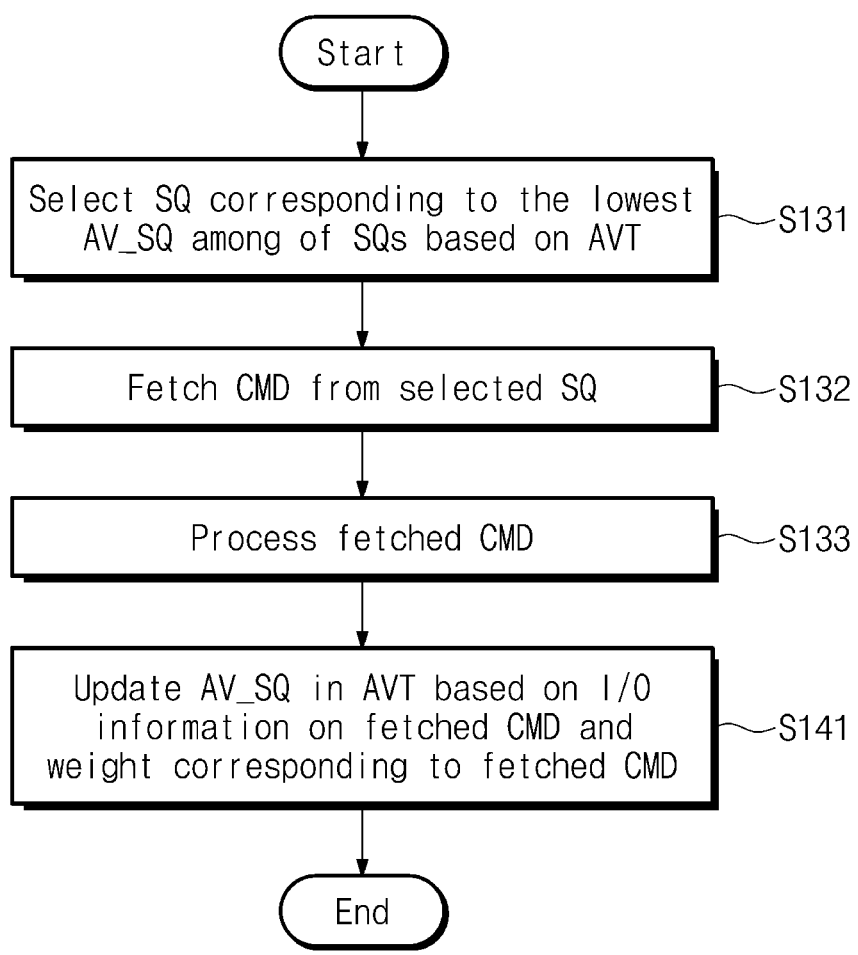
FIG. 6 is a flowchart illustrating operation S30 and operation S40 of FIG. 4 in detail.

FIG. 6 is a flowchart illustrating operation S30 and operation S40 of FIG. 4 in detail. An operation method of the storage device 100 according to the flowchart of FIG. 6 may be performed by using the aggregated value table AVTa described with reference to FIG. 5.

Referring to FIGS. 1, 2, 3A, and 5, operation S30 of FIG. 4 may include operation S131 to operation S133 of FIG. 6.

In operation S131, the storage device 100 may select a submission queue corresponding to the lowest aggregated value from among a plurality of submission queues SQ, based on the aggregated value table AVTa. For example, as described with reference to FIG. 5, the aggregated value table AVTa may include the submission queue aggregated values AV_SQ11 to AV_SQ32 associated with the plurality of submission queues SQ11 to SQ32. The performance manager 111 may search for the lowest submission queue aggregated value of the plurality of submission queue aggregated values AV_SQ11 to AV_SQ32 and may select a submission queue corresponding to the lowest value. In an exemplary embodiment, that a submission queue aggregated value is the lowest means that a ratio (in this case, a ratio to which information about minimum performance of a corresponding host is applied) by which a corresponding submission queue is serviced is the lowest. That is, a command of a submission queue serviced at a relatively small ratio may be preferentially processed by selecting a submission queue corresponding to the lowest submission queue aggregated value.

In operation S132, the storage device 100 may fetch a command from the selected submission queue. For example, the performance manager 111 (in particular, the command scheduler 111a) may perform a scheduling operation such that a command included in the submission queue SQ selected in operation S131 is fetched.

In operation S133, the storage device 100 may process the fetched command. For example, the storage controller 110 may allow the nonvolatile memory device 120 to perform an operation corresponding to the fetched command. In an exemplary embodiment, the storage controller 110 may perform the corresponding operation on a namespace or a nonvolatile memory (NVM) set of the nonvolatile memory device 120 corresponding to the submission queue of the fetched command or on a namespace or a nonvolatile memory (NVM) set managed by a physical function associated with the fetched command. In an exemplary embodiment, operation S133 may be performed by the processor 112 or the nonvolatile memory interface circuit 115 of the storage controller 110.

Operation S40 of FIG. 4 may include operation S141 of FIG. 6.

In operation S141, the storage device 100 may update the submission queue aggregated value AV_SQ of the aggregated value table AVT, based on a weight corresponding to the fetched command and I/O information corresponding to the fetched command. For example, the performance manager 111 (in particular, the aggregated value table manager 111b) may update the submission queue aggregated value AV_SQ of the aggregated value table AVT, based on a product of the weight corresponding to the fetched command and the I/O information corresponding to the fetched command.

Figure 7A:
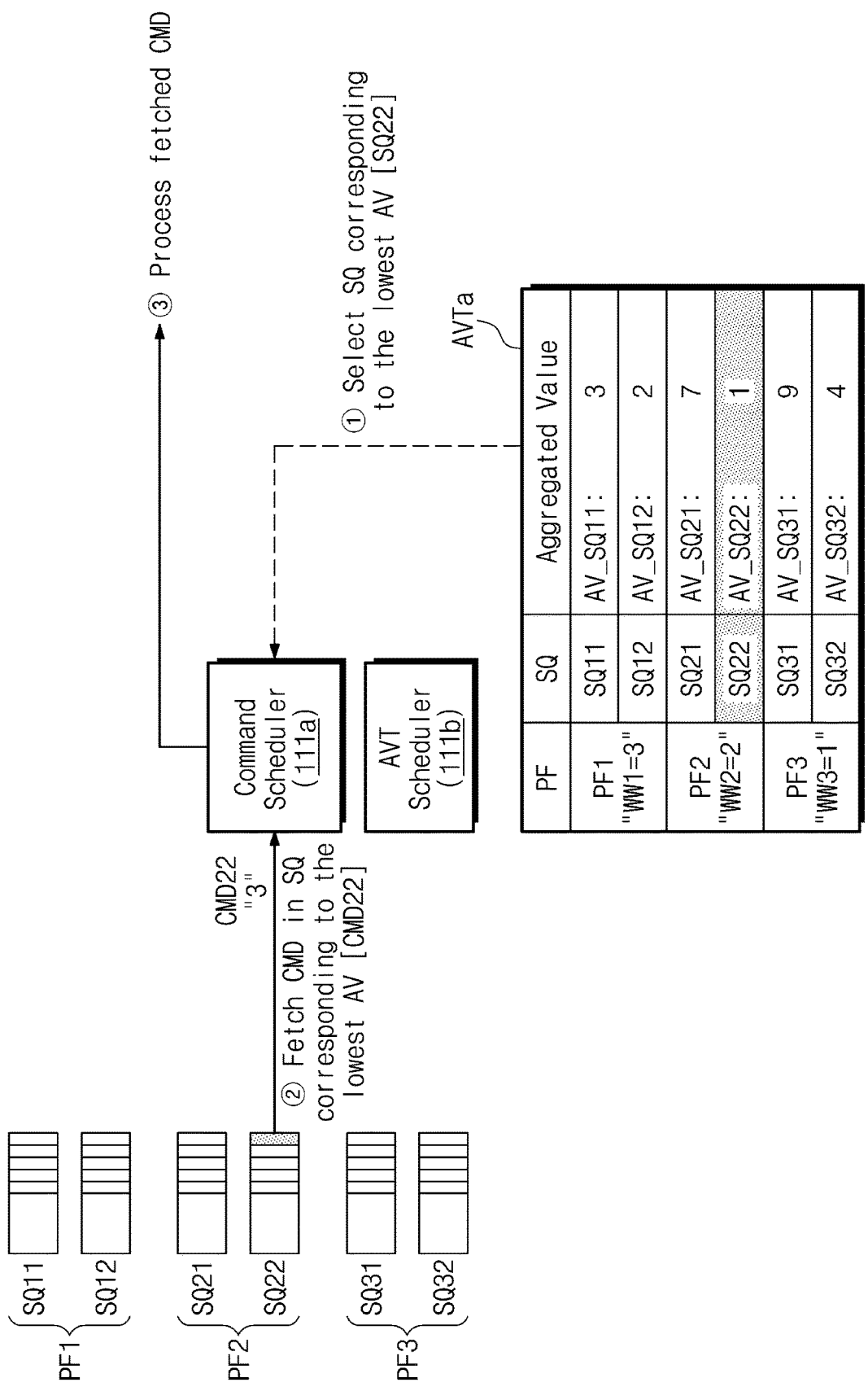
FIGS. 7A to 7C are diagrams for describing an operation of a storage device according to the flowcharts of FIGS. 5 and 6.
Figure 7B:
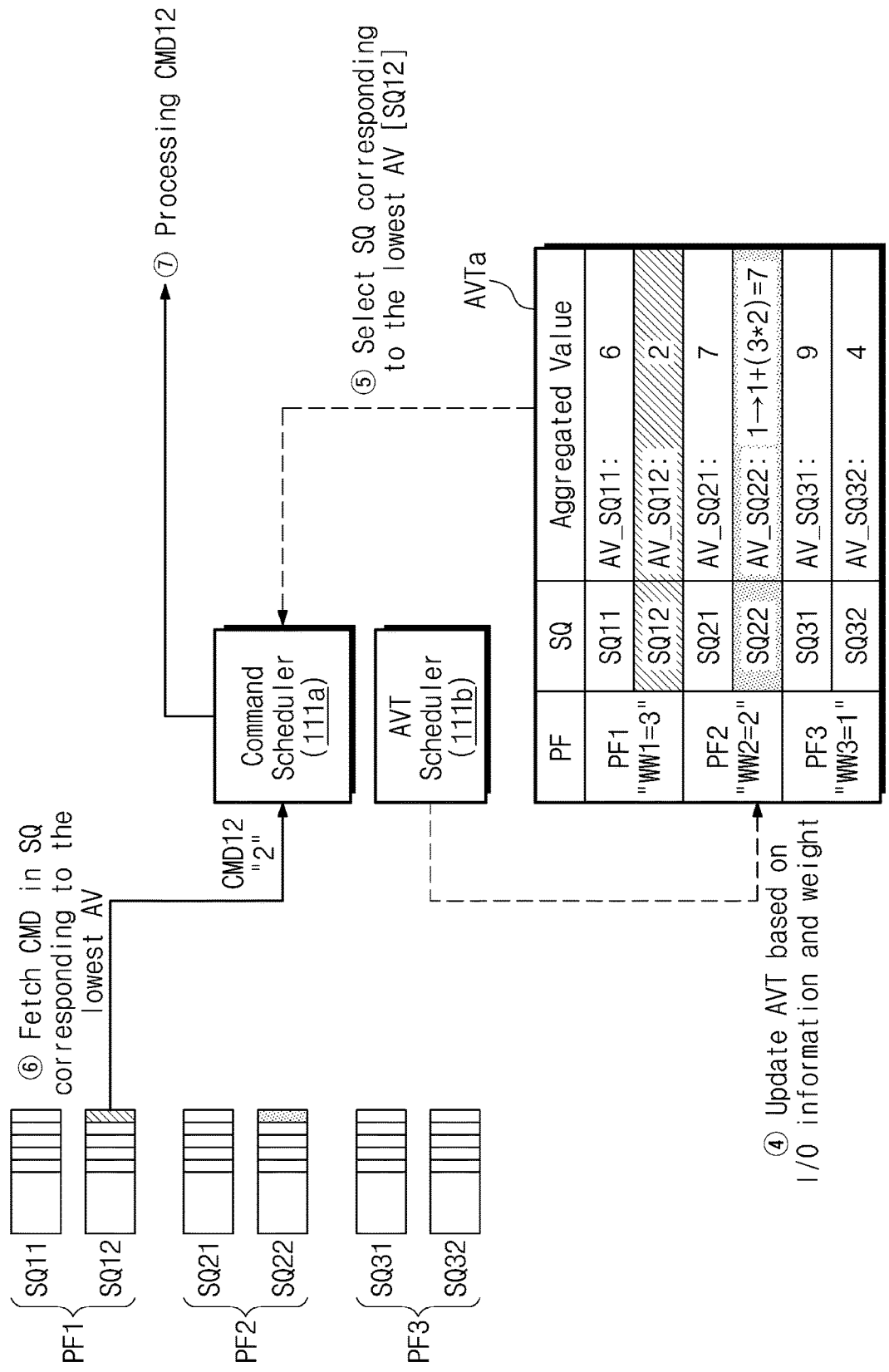
Figure 7C:
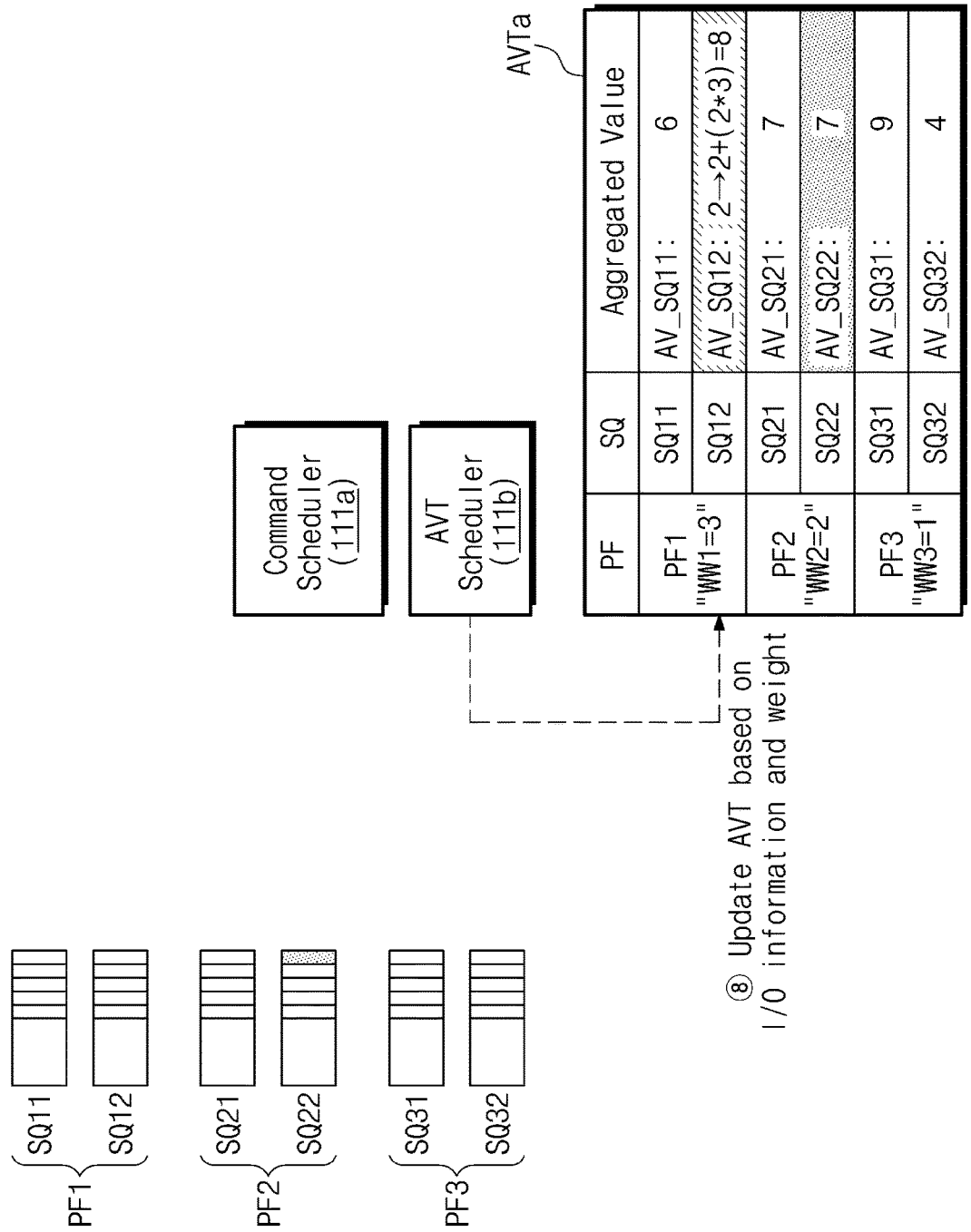

FIGS. 7A to 7C are diagrams for describing an operation of a storage device according to the flowcharts of FIGS. 5 and 6. For convenience of description, components that are unnecessary to describe an operation (in particular, command scheduling and aggregated value managing operations) of the storage device 100 according to the inventive concept are omitted.

Also, for convenience of description, it is assumed that the storage device 100 communicates three hosts, each of the three hosts manages two submission queues, and the three hosts correspond to the first to third physical functions PF1 to PF3, respectively. That is, the first physical function PF1 may correspond to the submission queues SQ11 and SQ12, the second physical function PF2 may correspond to the submission queues SQ21 and SQ22, and the third physical function PF3 may correspond to the submission queues SQ31 and SQ32.

Also, for convenience of description, it is assumed that all commands queued in each submission queue are write command and the storage device 100 performs write operations in response to the write commands. Also, it is assumed that a ratio of minimum performance of the three hosts is 2:3:6. In this case, a write weight corresponding to the first physical function PF1 may be 3, a write weight corresponding to the second physical function PF2 may be 2, and a write weight corresponding to the third physical function PF3 may be 1. The conditions and numerical values described above may be to describe the technical idea of the inventive concept, and the inventive concept is not limited thereto.

Referring to FIGS. 1, 2, and 7A to 7C, as illustrated in FIG. 7A, in operation ①, the command scheduler 111a of the performance manager 111 may select one of the plurality of submission queues SQ11 to SQ32 based on the aggregated value table AVTa. For example, the command scheduler 111a may search for the lowest submission queue aggregated value of the submission queue aggregated values AV_SQ11 to AV_SQ32 of the aggregated value table AVTa and may select a submission queue having the lowest submission queue aggregated value. In the embodiment of FIG. 7A, the submission queue SQ22 corresponding to the second physical function PF2 may be selected.

Afterwards, in operation ②, the command scheduler 111a may fetch a command CMD22 from the selected submission queue SQ22. In an exemplary embodiment, it is assumed that I/O information (e.g., a size of write data) of the fetched command CMD22 is "3". Afterwards, in operation ③, the command scheduler 111a may process the fetched command CMD22. In an exemplary embodiment, the fetched command CMD22 may be processed by any other component (e.g., an FTL driven by the processor 112, the nonvolatile memory interface circuit 115, or any other components) of the storage controller 110. In an exemplary embodiment, an operation corresponding to the fetched command CMD22 may be processed at an area, which is associated with the fetched command CMD22, the selected submission queue SQ22, or a physical function corresponding to the selected submission queue SQ22, from among areas (e.g., a namespace or an NVM set) of the nonvolatile memory device 120.

Afterwards, as illustrated in FIG. 7B, in operation ④, the aggregated value table manager 111b may update the aggregated value table AVTa based on I/O information and a weight. For example, as described above, the I/O information of the fetched command CMD22 may be "3", and the write weight WW2 of the second physical function PF2 associated with the selected submission queue SQ22 may be "2". In this case, the aggregated value table manager 111b may update the aggregated value table AVT by aggregating a product of the processed I/O information (i.e., "3") and the write weight WW2 (i.e., "2") at the submission queue aggregated value AV_SQ22 (i.e., "1"). That is, AV_SQ22 may be updated to "1+(3*2)=7".

That is, the aggregated value table AVTa may be updated by aggregating a product of processed I/O information (or an I/O size) and a corresponding weight at a current submission queue aggregated value. According to the update operation described above, a magnitude of a submission queue aggregated value may increase whenever a command of a submission queue is processed or a service associated with a submission queue is provided.

Afterwards, in operation ⑤, the command scheduler 111a may select a submission queue having the lowest submission queue aggregated value from the updated aggregated value table AVTa. In the embodiment of FIG. 7B, the submission queue SQ12 corresponding to the first physical function PF1 may be selected. Afterwards, in operation ⑥, the command scheduler 111a may fetch a command CMD12 from the selected submission queue SQ12. In an exemplary embodiment, it is assumed that I/O information of the fetched command CMD12 is "2". Afterwards, in operation ⑦, the command scheduler 111a may process the fetched command CMD12. Operation ⑤, operation ⑥, and operation ⑦ of FIG. 7B are similar to operation ①, operation ②, and operation ③ described with reference to FIG. 7A except that selected submission queues are different from each other and fetched commands are different from each other, and thus, additional description will be omitted to avoid redundancy.

Afterwards, as illustrated in FIG. 7C, in operation ⑧, the aggregated value table manager 111b may update the aggregated value table AVTa based on processed I/O information and a weight. For example, as in operation ④ described with reference to FIG. 7B, the aggregated value table manager 111b may update the aggregated value table AVT by aggregating a product of processed I/O information (i.e., "2") and the write weight WW1 (i.e., "3") at a current submission queue aggregated value AV_SQ12 (i.e., "2"). That is, AV_SQ12 may be updated to "2+(2*3)=8".

In an exemplary embodiment, as described above, the storage device 100 may provide a service associated with each of a plurality of hosts or a command associated with each of the plurality of host, by repeatedly performing the following operations: selecting a submission queue based on the aggregated value table AVT, fetching and processing a command from the selected submission queue, and updating the aggregated value table AVTa based on I/O information of the processed command and a corresponding weight.

In an exemplary embodiment, as described above, because the storage device 100 performs command scheduling based on an aggregated value table, a submission queue serviced at a relatively small ratio may be preferentially performed prior to any other submission queues. Accordingly, the storage device 100 may provide uniform performance to each of a plurality of hosts or may secure minimum performance of each of the plurality of hosts.

FIG. 8 is a diagram illustrating an aggregated value table of FIG. 2. For brevity of illustration and convenience of description, a data structure of the aggregated value table AVT will be briefly described, but the inventive concept is not limited thereto. Also, for convenience of description, a difference between an aggregated value table AVTb of FIG. 8 and the aggregated value table AVTa described with reference to FIG. 5 will be mainly described.

Referring to FIGS. 3A and 8, the aggregated value table AVTb may include identifier information about the physical function PF, aggregated value information about the physical function PF, identifier information about the submission queue SQ, aggregated value information about the submission queue SQ, and a plurality of weight information (e.g., a write weight, a read weight, and any other weight).

That is, compared to the aggregated value table AVTa of FIG. 5, the aggregated value table AVTb may further include physical function aggregated values AV_PF1, AV_PF2, and AV_PF3 respectively associated with the first to third physical functions PF1 to PF3. The physical function aggregated values AV_PF1, AV_PF2, and AV_PF3 may be managed or updated in a way that is similar to the way to manage or update the submission queue aggregated values AV_SQ11 to AV_SQ32.

For example, the physical function aggregated value AV_PF1 of the first physical function PF1 may be managed and updated by aggregating a product of I/O information of a processed command and a corresponding weight when a command from the submission queue SQ11 or SQ12 corresponding to the first physical function PF1 is processed. This is similar to the submission queue aggregated value updating method described above, and thus, additional description will be omitted to avoid redundancy.

In an exemplary embodiment, one physical function aggregated value (e.g., AV_PF1) may be equal to a sum of corresponding submission queue aggregated values (e.g., AV_SQ11 and AV_SQ12). Alternatively, one physical function aggregated value (e.g., AV_PF1) may be different from a sum of corresponding submission queue aggregated values (e.g., AV_SQ11 and AV_SQ12).

Figure 9:
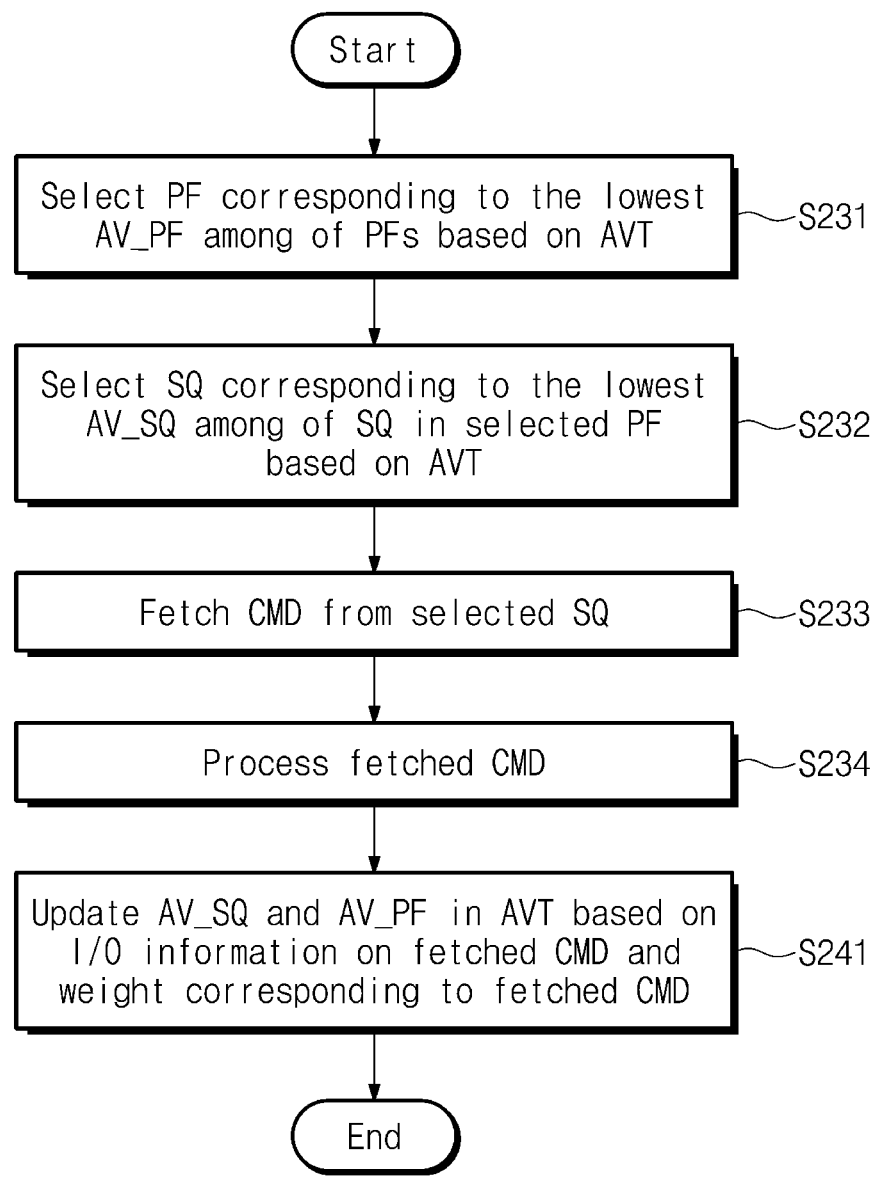
FIG. 9 is a flowchart illustrating operation S30 and operation S40 of the flowchart of FIG. 4 in detail.

FIG. 9 is a flowchart illustrating operation S30 and operation S40 of the flowchart of FIG. 4 in detail. For convenience of description, below, it is assumed that the storage device 100 communicates with the first to third hosts 11 to 13, the first to third hosts 11 to 13 correspond to the first to third physical functions PF1 to PF3, respectively, and one host manages two submission queues. A description associated with the assumption is given with reference to FIG. 4, and thus, additional description will be omitted to avoid redundancy. The above description is given as examples for describing the technical idea of the inventive concept, and the inventive concept is not limited thereto.

Referring to FIGS. 1, 2, 3A, 8, and 9, operation S30 of FIG. 4 may include operation S231 to operation S234 of FIG. 9.

In operation S231, the storage device 100 may select a physical function having the lowest physical function aggregated value AV_PF from among the first to third physical functions PF1 to PF3, based on the aggregated value table AVTb. For example, the performance manager 111 (in particular, the command scheduler 111a) may select a physical function having the lowest physical function aggregated value of physical function aggregated values AV_PF1 to AV_PF3 of the aggregated value table AVTb illustrated in FIG. 8.

In operation S232, the storage device 100 may select a submission queue having the lowest submission queue aggregated value from among submission queues of the selected physical function, based on the aggregated value table AVTb. For example, the performance manager 111 (in particular, the command scheduler 111a) may select a submission queue having the lowest submission queue aggregated value from among submission queues of the selected physical function, based on the aggregated value table AVTb illustrated in FIG. 8. In detail, it is assumed that the physical function selected in operation S231 is the second physical function PF2. In this case, in operation S232, the performance manager 111 may select a submission queue having the lowest value of the submission queue aggregated values AV_SQ21 and AV_SQ22 of the submission queues SQ21 and SQ22 corresponding to the second physical function PF2.

Afterwards, the storage device 100 may perform operation S233 and operation S234, and operation S233 and operation S234 are similar to operation S122 and operation S123 of FIG. 6, and thus, additional description will be omitted to avoid redundancy.

Operation S40 of FIG. 4 may include operation S241 of FIG. 9.

In operation S241, the storage device 100 may update the submission queue aggregated value AV_SQ and the physical function aggregated value AV_PF of the aggregated value table AVTb, based on I/O information corresponding to a fetched command (or a processed command) and a corresponding weight. For example, the performance manager 111 (in particular, the aggregated value table manager 111b) may update the aggregated value table AVTb by aggregating a product of the I/O information corresponding to the processed command and the corresponding weight at each of the submission queue aggregated value AV_SQ and the physical function aggregated value AV_PF.

Figure 10A:
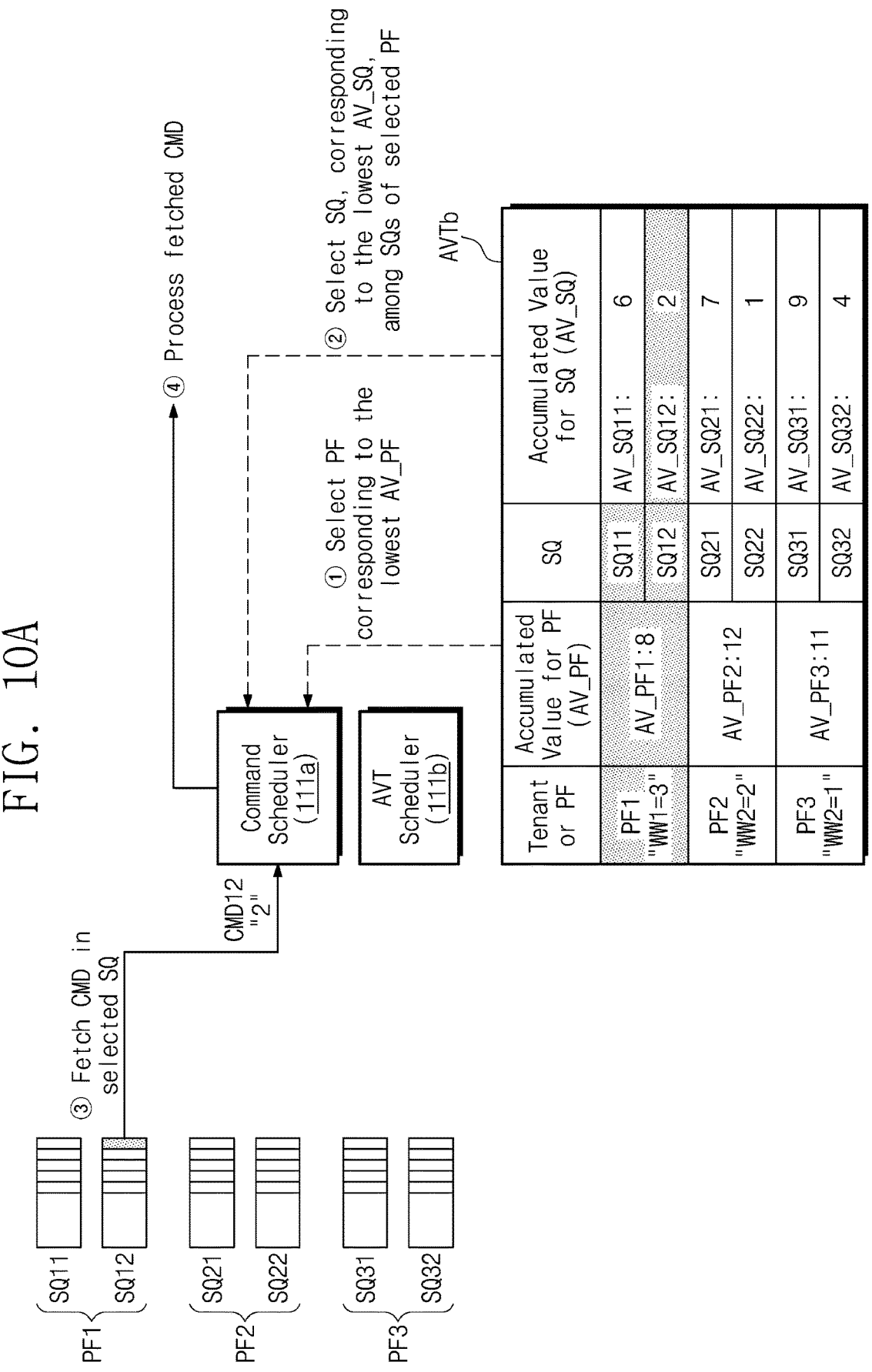
FIGS. 10A to 10C are diagrams for describing an operation of a storage device according to the flowchart of FIG. 9.
Figure 10B:
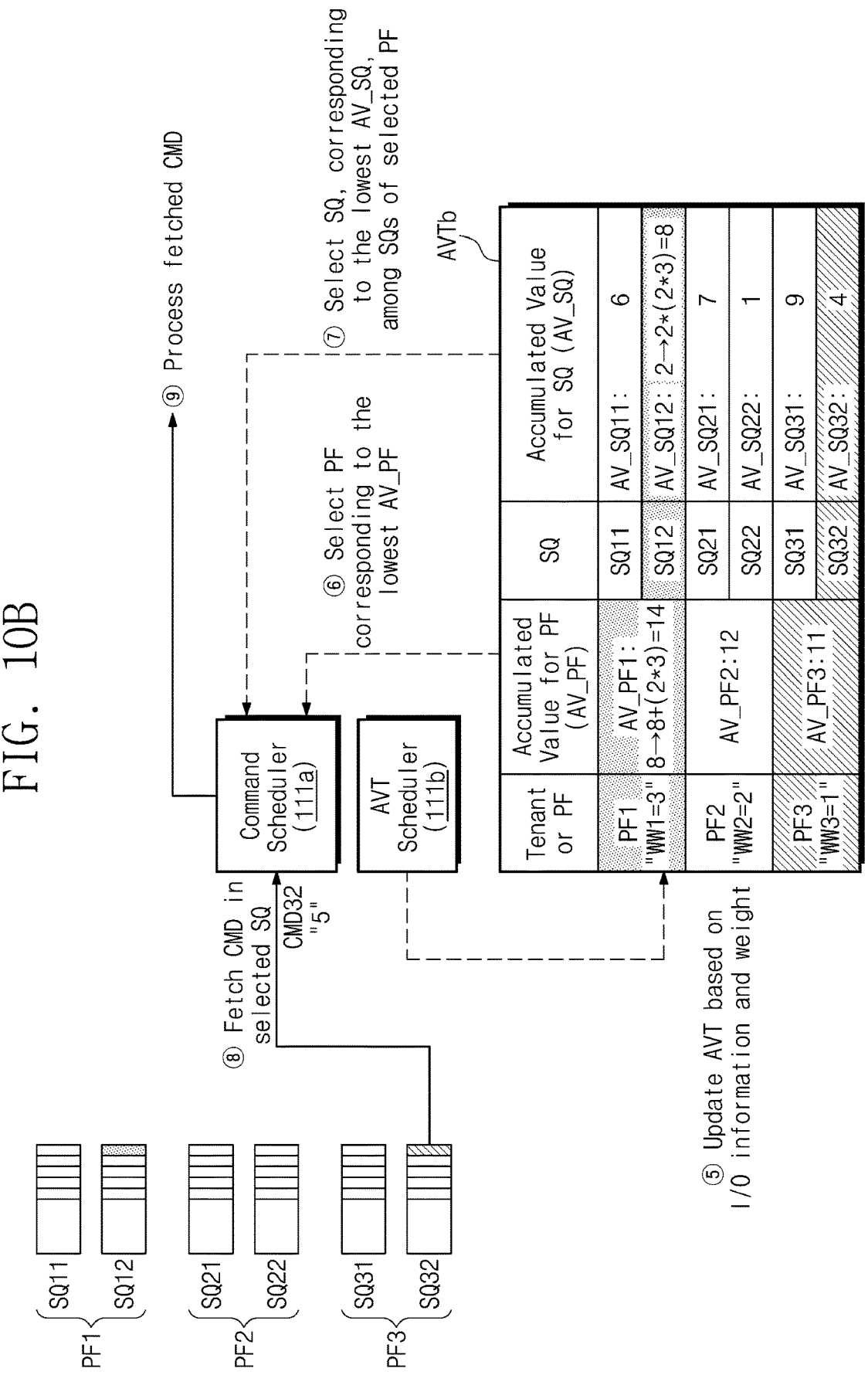
Figure 10C:
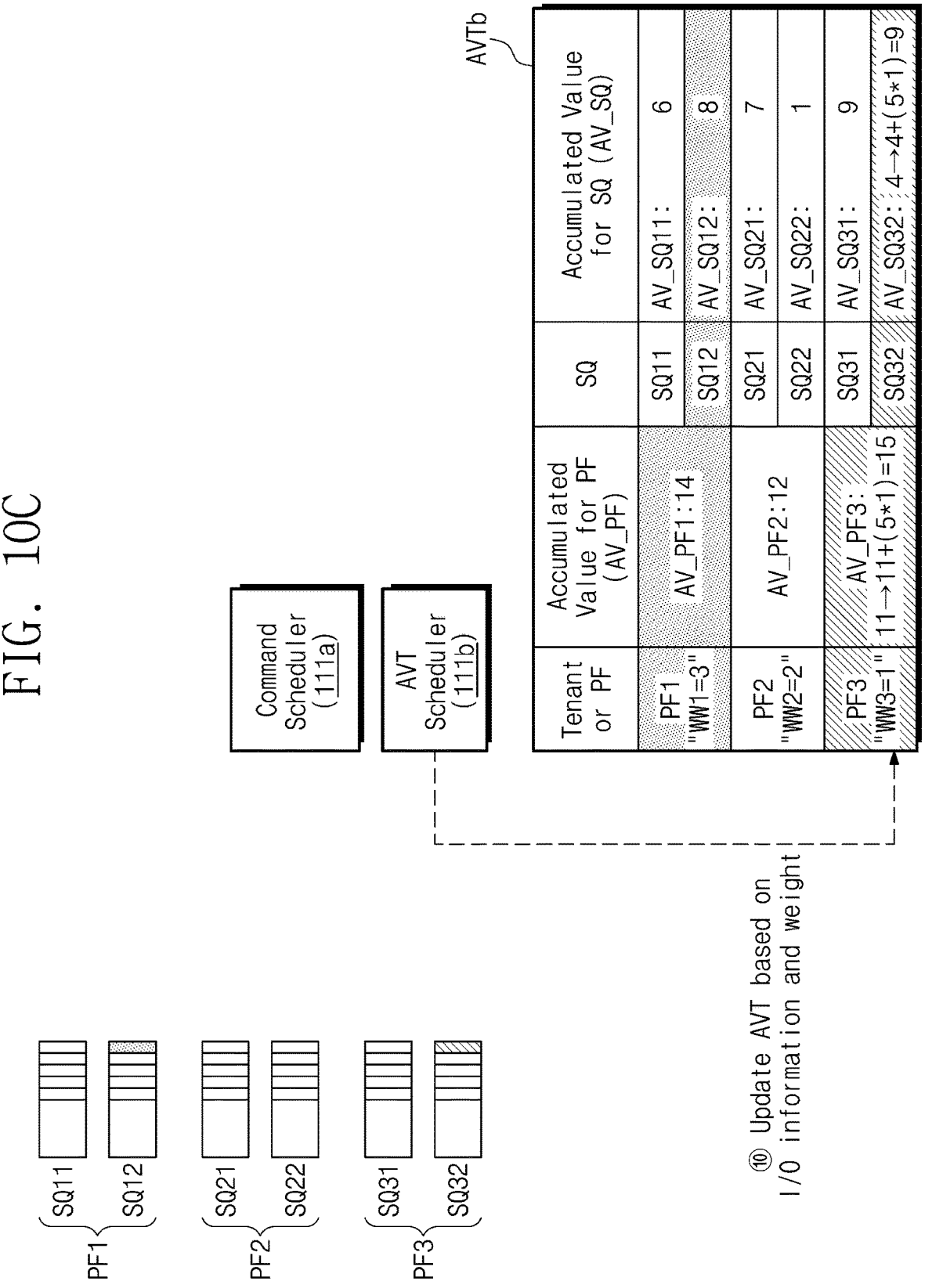

FIGS. 10A to 10C are diagrams for describing an operation of a storage device according to the flowchart of FIG. 9. For convenience of description, components that are unnecessary to describe an operation (in particular, command scheduling and aggregated value managing operations) of the storage device 100 according to the inventive concept are omitted.

The physical functions PF1 to PF3, the submission queues SQ11 and SQ12, SQ21 and SQ22, and SQ31 and SQ32, and the weights WW1 to WW3 of FIGS. 10A to 10C are described with reference to FIGS. 7A to 7C, and thus, additional description will be omitted to avoid redundancy.

Referring to FIGS. 1, 2, and 10A to 10C, in operation ①, the command scheduler 111a may select a physical function having the lowest value of the physical function aggregated values AV_PF1 to AV_PF3 based on the aggregated value table AVTb. For example, in the embodiment illustrated in FIG. 10A, because the first physical function aggregated value AV_PF1 of "8" is the lowest, the first physical function PF1 may be selected.

In operation ②, the command scheduler 111a may select a submission queue having the lowest submission queue aggregated value from among submission queues (e.g., SQ11 and SQ12) of the selected physical function (e.g., PF1). In the embodiment of FIG. 10A, because the submission queue aggregated value AV_SQ12 (="2") of the submission queue SQ12 of the submission queues SQ11 and SQ12 is the lowest, the command scheduler 111a may select the submission queue SQ12. That is, through operation ① and operation ②, the command scheduler 111a may select the submission queue SQ12 of the first physical function PF1. This may mean that commands of the first host 11 corresponding to the first physical function PF1 are processed at a relatively small frequency and commands of the submission queue SQ12 of the submission queues SQ11 and SQ12 of the first host 11 are processed at a relatively small frequency.

Afterwards, the command scheduler 111a performs operation ③ and operation ④. Operation ③ and operation ④ of FIG. 10A are similar to operation ② (i.e., a command fetch operation) and operation ③ (i.e., a command processing operation) of FIG. 7A, and thus, additional description will be omitted to avoid redundancy.

Next, as illustrated in FIG. 10B, in operation ⑤, the aggregated value table manager 111b may update the aggregated value table AVTb based on I/O information (e.g., a size of write data) (e.g., "2") of the processed command CMD12 and the corresponding weight WW1 (="3"). For example, the aggregated value table manager 111b may aggregate a product (i.e., "2*3") of the I/O information (e.g., a size of write data) (e.g., "2") of the processed command CMD12 and the corresponding weight WW1 (="3") at each of the submission queue aggregated value AV_SQ12 of the selected submission queue SQ12 and the physical function aggregated value AV_PF1 of the selected physical function PF1. In an exemplary embodiment, the aggregated value table manager 111b may add the product (i.e., "2*3") of the I/O information (e.g., a size of write data) (e.g., "2") of the processed command CMD12 and the corresponding weight WW1 (="3") to each of the submission queue aggregated value AV_SQ12 of the selected submission queue SQ12 and the physical function aggregated value AV_PF1 of the selected physical function PF1. In this case, AV_PF1 may be updated to "8+(2*3)=14", and AV_SQ12 may be updated to "2+(2*3)=8".

Afterwards, in operation ⑥, the command scheduler 111a may select a physical function having the lowest physical function aggregated value AV_PF from the updated aggregated value table AVTb. In the embodiment of FIG. 10B, referring to the aggregated value table AVTb updated in operation ⑤, because the third physical function aggregated value AV_PF3 of "11" is the lowest, the command scheduler 111a may select the third physical function PF3 corresponding to the third physical function aggregated value AV_PF3.

Afterwards, in operation ⑦, the command scheduler 111a may select a submission queue having the lowest value from among the submission queues SQ31 and SQ32 of the selected physical function PF3. In the embodiment of FIG. 10B, because the submission queue aggregated value AV_SQ32 (="4") of the submission queue SQ32 of the submission queues SQ31 and SQ32 of the third physical function PF3 is the lowest, the submission queue SQ32 may be selected.

Afterwards, the command scheduler 111a performs operation ⑧ and operation ⑨. Operation ⑧ and operation ⑨ of FIG. 10B are similar to operation ② (i.e., a command fetch operation) and operation ③ (i.e., a command processing operation) of FIG. 7A, and thus, additional description will be omitted to avoid redundancy.

Afterwards, as illustrated in FIG. 10C, in operation ⑩, the aggregated value table manager 111b may update the aggregated value table AVTb based on I/O information (e.g., a size of write data) (e.g., "5") of the processed command CMD32 and the corresponding weight WW3 (="1"). For example, as in ⑤ operation of FIG. 10B, the aggregated value table manager 111b may aggregate a product of the I/O information (e.g., a size of write data) (e.g., "5") of the processed command CMD32 and the corresponding weight WW3 (="3") at each of the physical function aggregated value AV_PF3 of the selected physical function PF3 and the submission queue aggregated value AV_SQ32 of the selected submission queue SQ32. In an exemplary embodiment, the aggregated value table manager 111b may add the product of the I/O information (e.g., a size of write data) (e.g., "5") of the processed command CMD32 and the corresponding weight WW3 (="3") to each of the physical function aggregated value AV_PF3 of the selected physical function PF3 and the submission queue aggregated value AV_SQ32 of the selected submission queue SQ32. In this case, AV_PF3 may be updated to "11+(5*1)=16", and AV_SQ32 may be updated to "4+(5*1)=9".

Although not illustrated in drawing, as in the above description, the command scheduler 111a and the aggregated value table manager 111b may perform command scheduling and aggregated value table updating. That is, in the following operation, the second physical function PF2 having the physical function aggregated value AV_PF of "12" may be selected, and the submission queue SQ22 having the submission queue aggregated value AV_SQ of "1" from among the submission queues SQ21 and SQ22 of the second physical function PF2 may be selected.

As described above, the storage device 100 according to an embodiment of the inventive concept may select or schedule a command to be processed, based on an aggregated value (e.g., I/O information to which a weight is applied) corresponding to I/O information of a processed command, in units of a physical function and in units of a submission queue. Accordingly, because a command associated with a physical function (or a host) and a submission queue serviced at a relatively small frequency is preferentially processed, performance of a plurality of hosts may be uniform, or minimum performance of each of the plurality of hosts may be secured.

Figure 11:
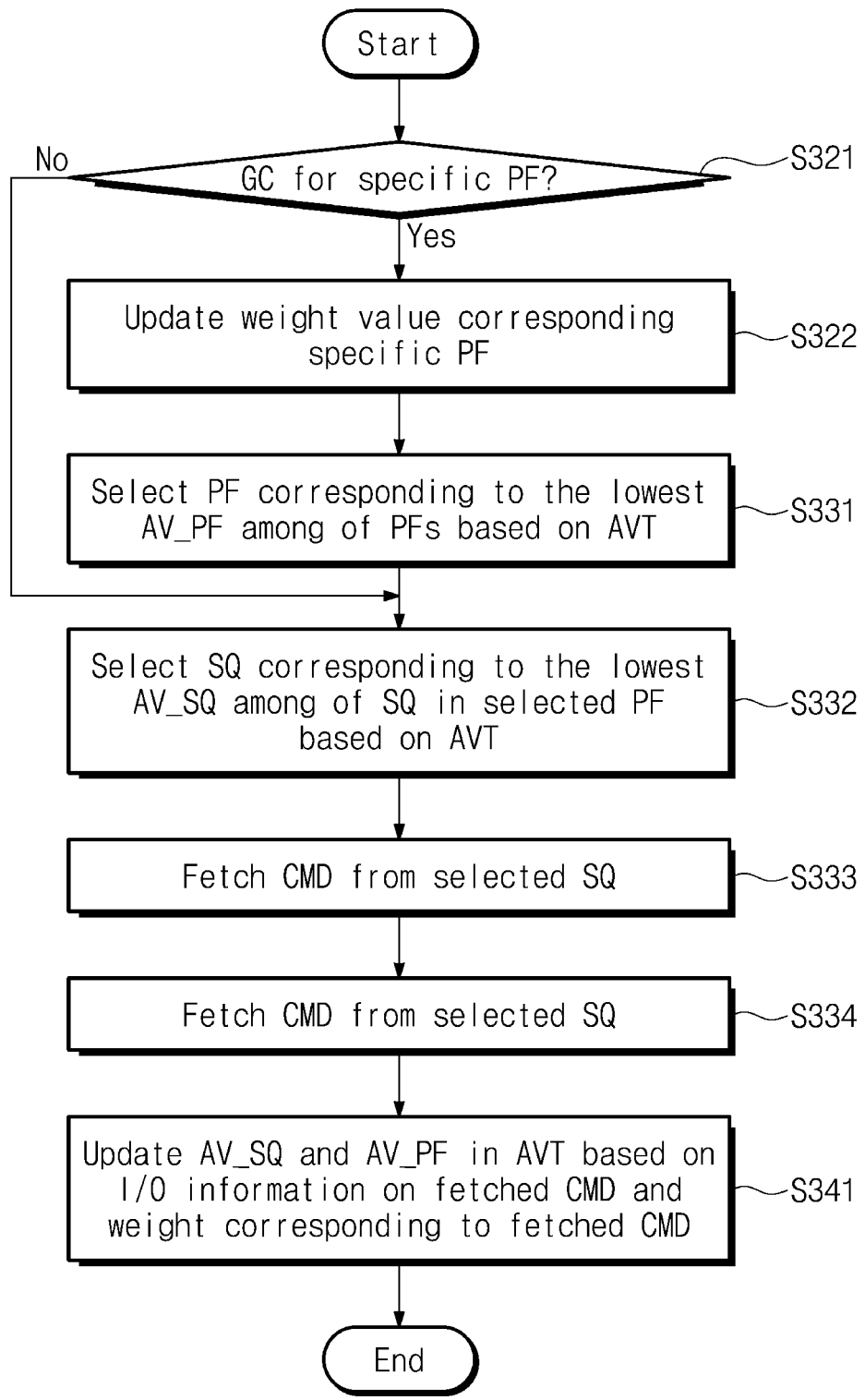
FIG. 11 is a flowchart illustrating operation S20, operation S30, and operation S40 of the flowchart of FIG. 4 in detail.

FIG. 11 is a flowchart illustrating operation S20, operation S30, and operation S40 of the flowchart of FIG. 4 in detail. For convenience of description, below, it is assumed that the storage device 100 communicates with the first to third hosts 11 to 13, the first to third hosts 11 to 13 correspond to the first to third physical functions PF1 to PF3, respectively, and one host manages two submission queues. A description associated with the assumption is given with reference to FIG. 4, and thus, additional description will be omitted to avoid redundancy. The above description is given as examples for describing the technical idea of the inventive concept, and the inventive concept is not limited thereto.

Referring to FIGS. 1, 2, 3A, and 11, operation S20 of FIG. 4 may include operation S321 to operation S322 of FIG. 11.

In operation S321, the storage device 100 may determine whether garbage collection is performed or required with regard to a specific physical function. For example, the storage device 100 may perform a separate maintenance operation (e.g., a garbage collection operation or a read reclaim operation) due to a physical limitation of the nonvolatile memory device 120. The above maintenance operation may be an operation that is processed within the storage device 100.

With regard to the same command, an internal workload may vary depending on whether the above maintenance operation is performed. For example, it is assumed that a workload associated with a first write command is "1" in the case where garbage collection corresponding to the first physical function PF1 is not performed. In this case, it is assumed that a workload associated with the first write command increases to "4" in the case where garbage collection corresponding to the first physical function PF1 is performed. In an exemplary embodiment, a magnitude of a workload increased by the execution of the garbage collection may be determined by a write amplification factor WAF of the storage device 100. That is, the execution of the maintenance operation of the storage device 100 may have an influence on performance to be serviced to a plurality of hosts.

When it is determined that the maintenance operation such as garbage collection GC is performed with regard to the specific physical function PF, in operation S322, the storage device 100 may update weight values corresponding to the specific physical function PF. For example, the performance manager 111 (in particular, the weight manager 111c) may update a weight value corresponding to a physical function experiencing the maintenance operation or requiring the maintenance operation. In an exemplary embodiment, a write weight value corresponding to a physical function experiencing the maintenance operation or requiring the maintenance operation may be increased.

Afterwards, the storage device 100 may perform operation S331 to operation S334 and operation S341, and operation S331 to operation S334 and operation S341 are similar to operation S231 to operation 234 and operation S241 FIG. 9, and thus, additional description will be omitted to avoid redundancy.

Figure 12A:
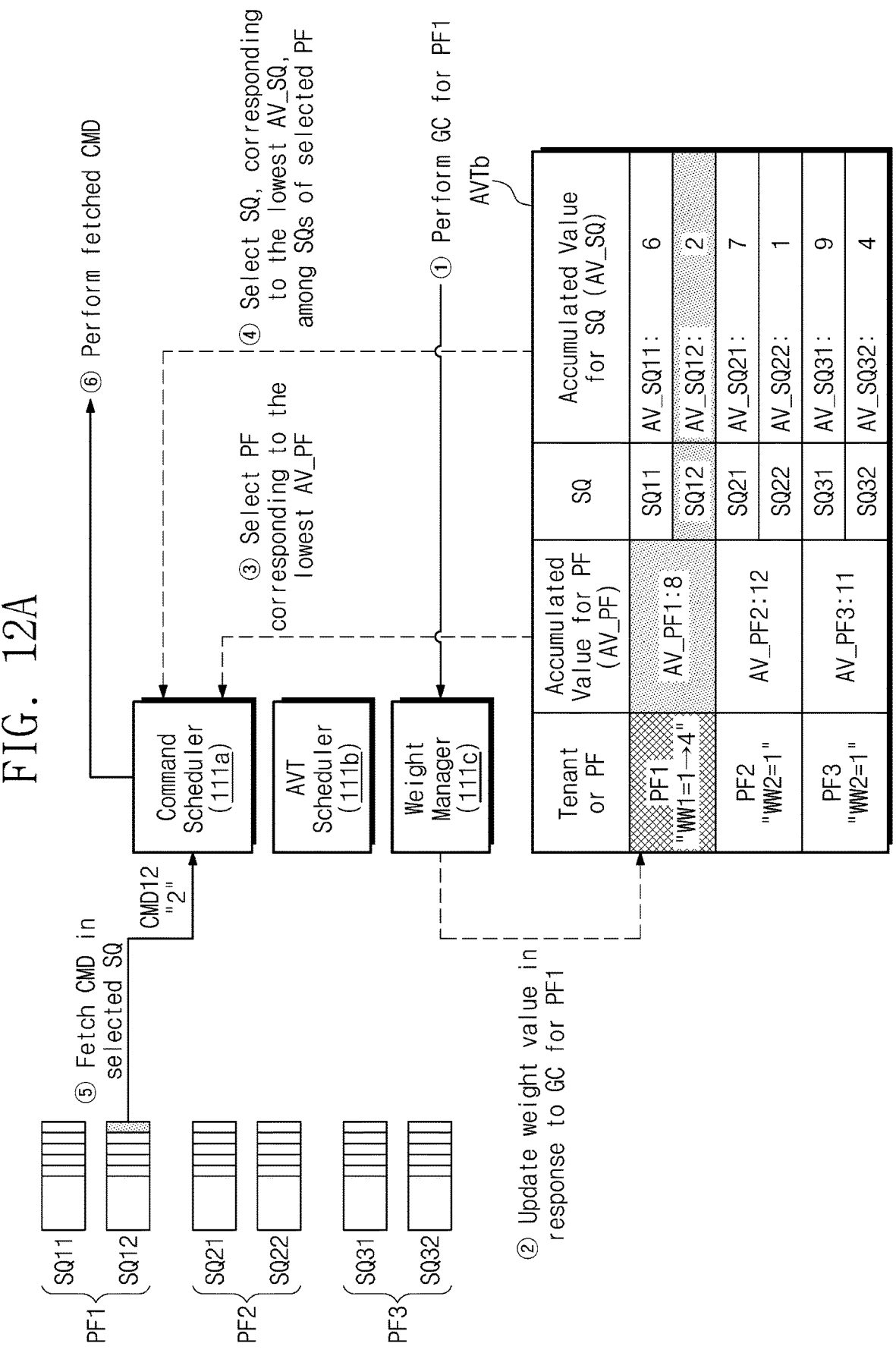
FIGS. 12A to 12C are diagrams for describing an operation of a storage device according to the flowchart of FIG. 11.
Figure 12B:
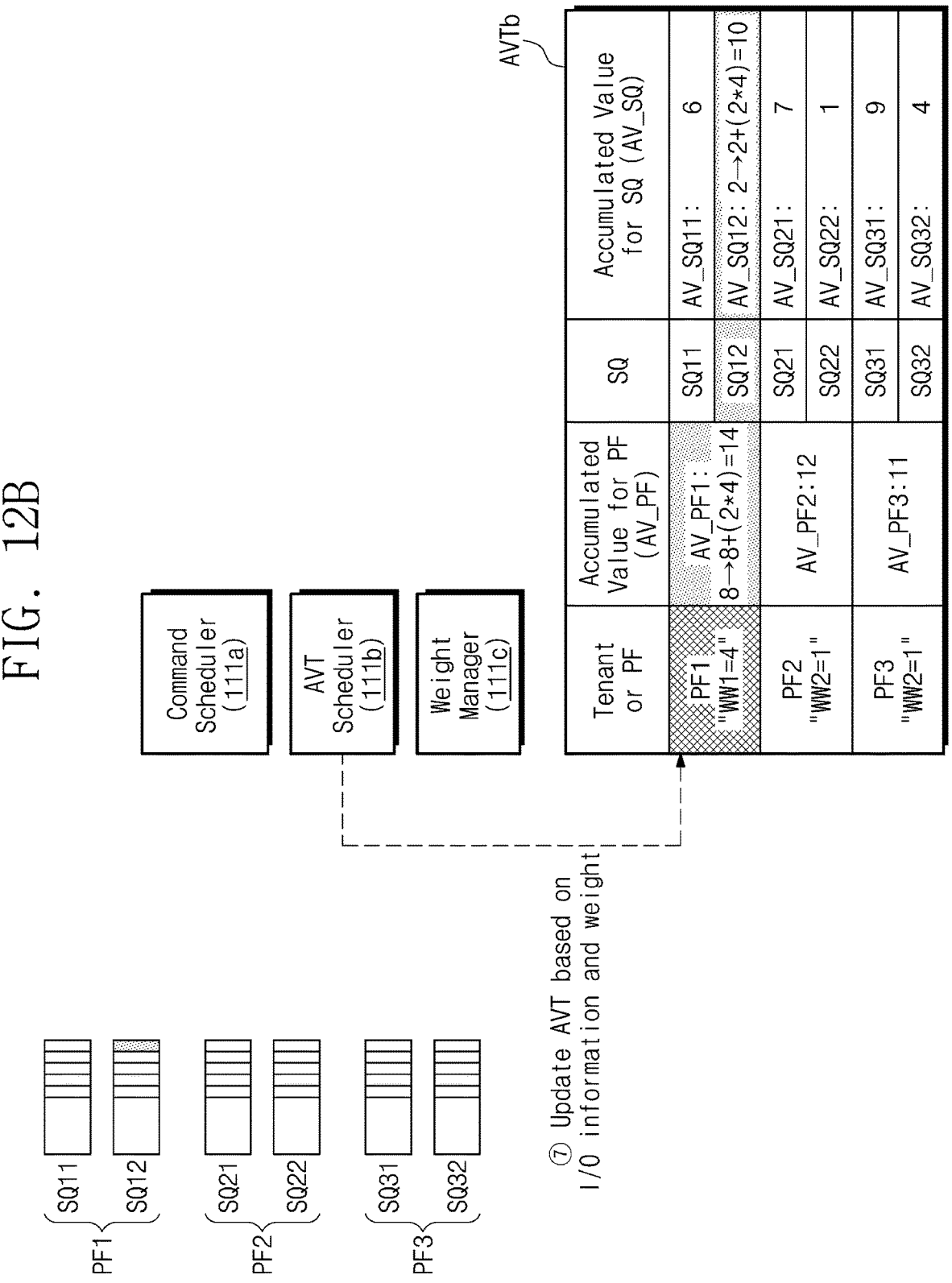
Figure 12C:
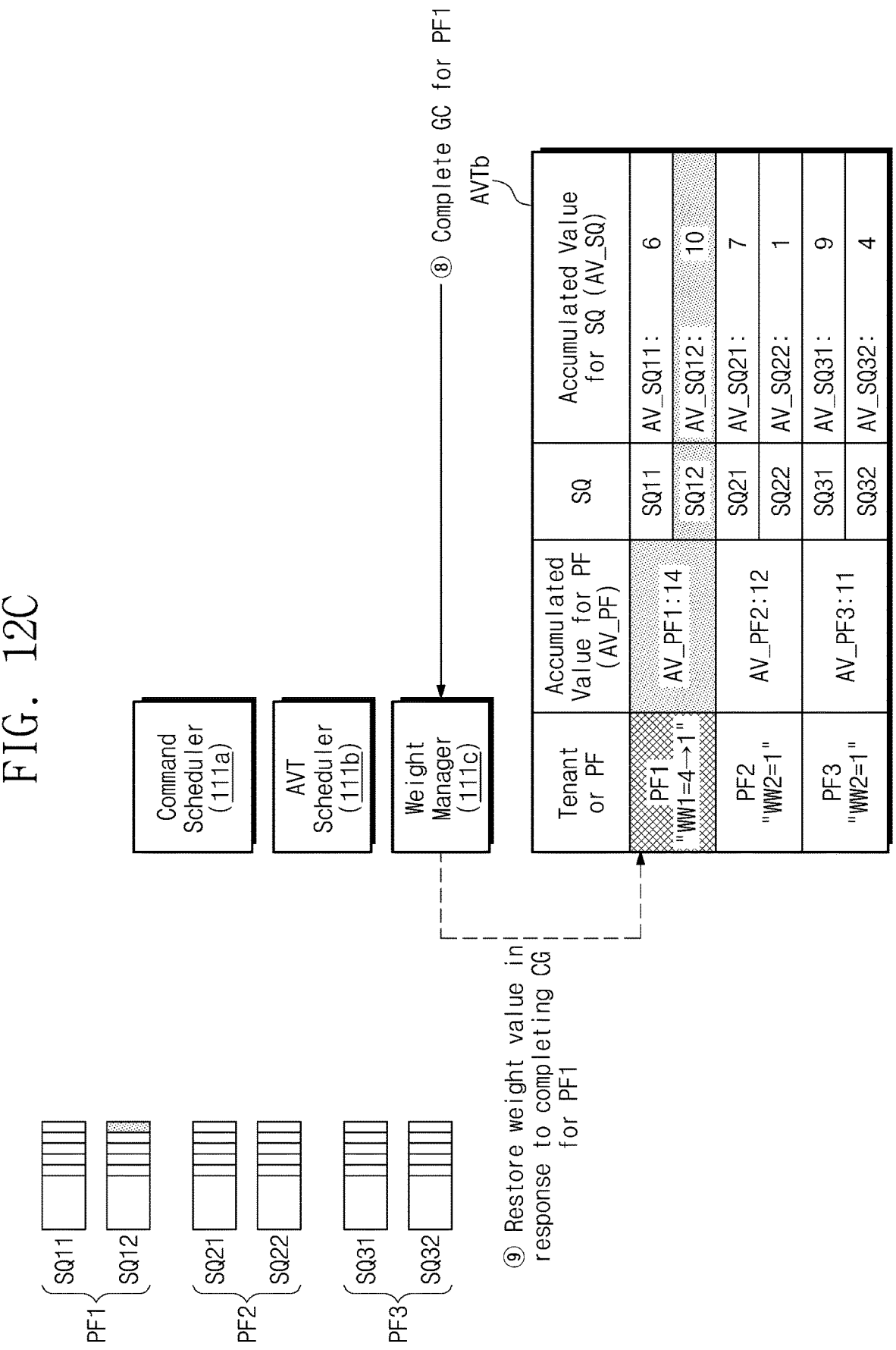

FIGS. 12A to 12C are diagrams for describing an operation of a storage device according to the flowchart of FIG. 11. For convenience of description, components that are unnecessary to describe an operation (in particular, command scheduling and aggregated value managing operations) of the storage device 100 according to the inventive concept are omitted. The physical functions PF1 to PF3, the submission queues SQ11 and SQ12, SQ21 and SQ22, and SQ31 and SQ32, and the weights WW1 to WW3 of FIGS. 12A to 12C are described with reference to FIGS. 7A to 7C, and thus, additional description will be omitted to avoid redundancy. However, for convenience of description, it is assumed that all the first to third write weight values WW1 to WW3 respectively corresponding to the first to third physical functions PF1 to PF3 of FIGS. 12A to 12C are "1".

Referring to FIGS. 1, 2, and 12A to 12C, as illustrated in FIG. 12A, in operation ①, the weight manager 111c may check that the first physical function PF1 experiences or requires the garbage collection GC. For example, depending on an internal policy of the storage device 100, the storage device 100 may perform or require the garbage collection GC with regard to an area corresponding to the first physical function PF1 from among areas (e.g., a namespace, an NVM set, or physical memory blocks) of the nonvolatile memory device 120. In this case, the weight manager 111c may recognize that the garbage collection GC is performed or required with regard to the first physical function PF1.

In operation ②, the weight manager 111c may update the first write weight WW1 of the first physical function PF1 experiencing or requiring the garbage collection GC. For example, the weight manager 111c may update the first write weight WW1 corresponding to the first physical function PF1 from "1" to "4". In an exemplary embodiment, an update rate of the first write weight WW1 may be determined based on the write amplification factor WAF that is required to perform the maintenance operation.

Afterwards, the command scheduler 111a performs operation ③, operation ④, operation ⑤, and operation ⑥. Operation ③ to operation ⑥ of FIG. 12A are similar to operation ① to operation ④ of FIG. 10A, and thus, additional description will be omitted to avoid redundancy.

Next, as illustrated in FIG. 12B, in operation ⑦, the aggregated value table manager 111b may update the aggregated value table AVTb based on I/O information (e.g., a size of write data) (e.g., "2") of the processed command CMD12 and the updated weight WW1 (="4"). For example, the aggregated value table manager 111b may aggregate a product of the I/O information (e.g., a size of write data) (i.e., "2") of the processed command CMD12 and the update weight WW1 (i.e., "4") at each of the physical function aggregated value AV_PF1 and the submission queue aggregated value AV_SQ12. In an exemplary embodiment, the aggregated value table manager 111b may add the product of the I/O information (e.g., a size of write data) (i.e., "2") of the processed command CMD12 and the update weight WW1 (i.e., "4") to each of the physical function aggregated value AV_PF1 and the submission queue aggregated value AV_SQ12. In this case, AV_PF1 may be updated to "8+(2*4)=14", and AV_SQ12 may be updated to "2+(2*4)=10".

In an exemplary embodiment, in the case where garbage collection is not considered and the weight WW1 associated with the first physical function PF1 is not updated, the command scheduler 111a may again select the submission queue SQ12 of the first physical function PF1 in the case of processing a next command. In this case, because the first physical function PF1 is in a state where an internal workload increases due to garbage collection, the processing of the next command may be relatively delayed.

In contrast, as described above, in the case where the weight WW1 associated with the first physical function PF1 is updated in consideration of garbage collection, the command scheduler 111a may select the submission queue SQ32 of the third physical function PF3 in the case of processing a next command. In this case, even though the workload of the first physical function PF1 is increased, because a command associated with the third physical function PF3 is processed, a performance difference between a plurality of hosts may be decreased, or minimum performance of each of the plurality of hosts may be secured.

In an exemplary embodiment, as illustrated in FIG. 12C, in operation ⑧, the weight manager 111c may check that the garbage collection GC associated with the first physical function PF1 is completed. In this case, in operation ⑨, the weight manager 111c may update or recover the first write weight WW1 corresponding to the first physical function PF1 from "4" to "1". That is, in the following operation of the storage device 100, the above operations may be performed based on the first write weight WW1 again updated.

As described above, the storage device 100 according to an embodiment of the inventive concept may provide uniform performance to each of a plurality of hosts or may secure minimum performance of each of the plurality of hosts, by considering an internal workload occurring due to a maintenance operation, as well as an external workload serviced with regard to each of the plurality of hosts. The above command scheduling or arbitration operation of the storage device 100 may be called "weighted fair queuing (WFQ) arbitration".

As described above, according to an embodiment of the inventive concept, the storage device 100 may set weights to a plurality of hosts, a plurality of physical functions, or a plurality of submission queues based on performance information (e.g., information about minimum performance) about a plurality of hosts and may manage aggregated values respectively associated with the plurality of hosts, the plurality of physical functions, or the plurality of submission queues based on information about the set weight and the processed I/O. The storage device 100 may perform command scheduling on commands from the plurality of hosts based on the aggregated values thus managed. Accordingly, a command from a host serviced at a relatively small frequency may be first processed. In this case, the performance of each of the plurality of hosts may become uniform, or minimum performance of each of the plurality of hosts may be secured.

In an exemplary embodiment, the storage device 100 according to an embodiment of the inventive concept may perform the command scheduling described with reference to FIGS. 1 to 12C in response to a command or a control from at least one of the plurality of hosts or from any other external computing node. That is, the storage device 100 may change a command scheduling under control of the plurality of hosts.

Figure 13:
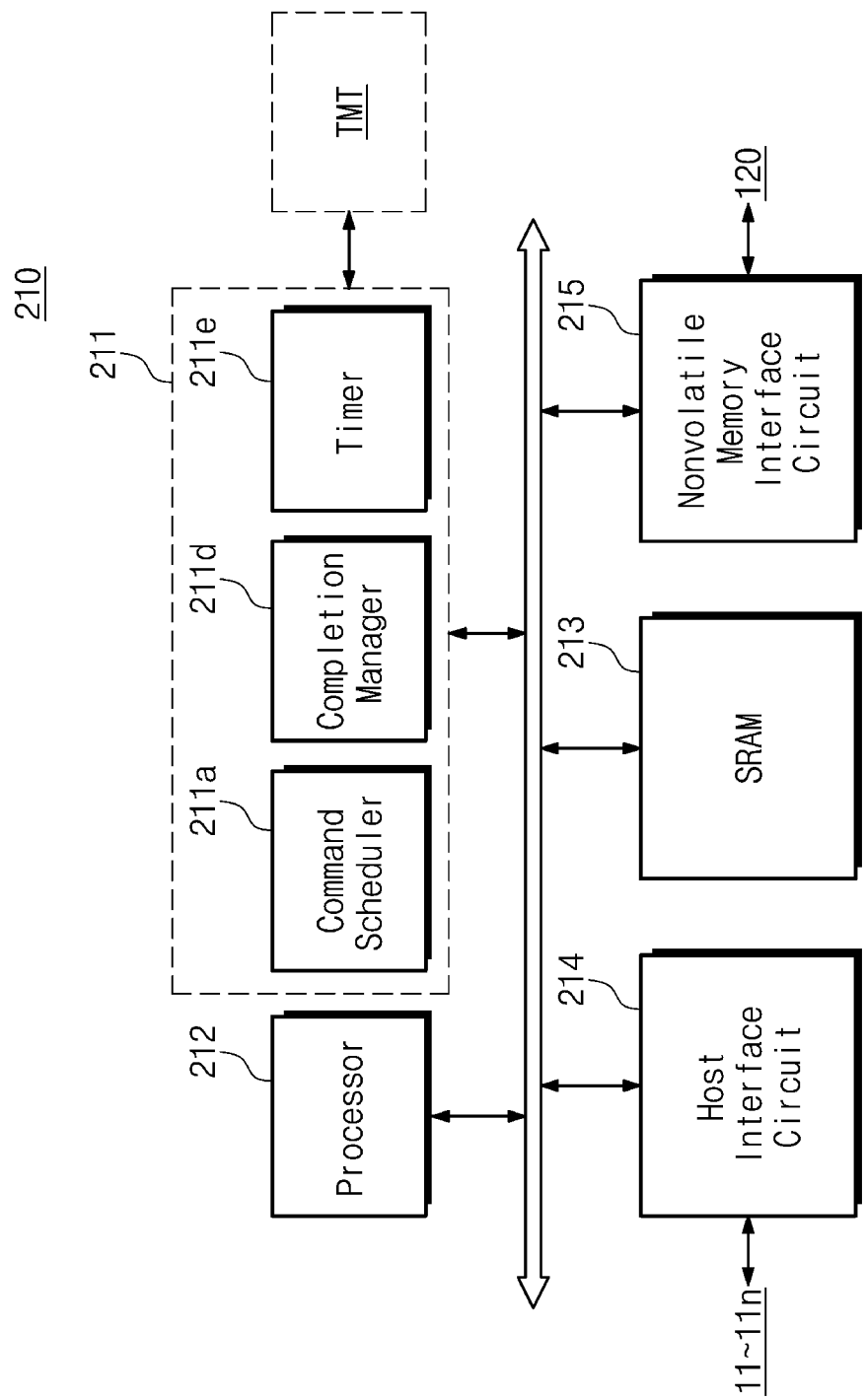
FIG. 13 is a block diagram illustrating a storage controller according to an embodiment of the inventive concept.

FIG. 13 is a block diagram illustrating a storage controller according to an embodiment of the inventive concept. FIG. 14 is a diagram illustrating a token management table of FIG. 13. For convenience of description, additional description associated with the components described above will be omitted to avoid redundancy. In an exemplary embodiment, a storage controller 210 of FIG. 13 may be configured to communicate with the hosts 11 to 1n and the nonvolatile memory device 120 of FIG. 1.

Referring to FIGS. 13 and 14, the storage controller 210 may include a performance manager 211, a processor 212, an SRAM 213, a host interface circuit 214, and a nonvolatile memory interface circuit 215. The processor 212, the SRAM 213, the host interface circuit 214, and the nonvolatile memory interface circuit 215 are described above, and thus, additional description will be omitted to avoid redundancy.

In the embodiment described with reference to FIGS. 1 to 12C, the performance manager 111 may operate to secure minimum performance of each of the plurality of hosts 11 to 1n. In contrast, the performance manager 211 of FIG. 13 may be configured to limit maximum performance of each of the plurality of hosts 11 to 1n. In other words, the performance manager 211 of FIG. 13 may process a command such that performance of each of the plurality of hosts 11 to 1n does not exceed the given maximum performance.

For example, the performance manager 211 may include a command scheduler 211a, a completion manager 211d, and a timer 211e. The command scheduler 211a may be configured to schedule commands from the plurality of hosts 11 to 1n. In an exemplary embodiment, the command scheduler 211a may be configured to schedule commands based on the scheduling method (i.e., a scheduling method based on an aggregated value of the physical function PF or the submission queue SQ or a WFQ scheduling method) described with reference to FIGS. 1 to 12C. A configuration and an operation of the command scheduler 211a are described above, and thus, additional description will be omitted to avoid redundancy.

The completion manager 211d may be configured to manage an I/O completion indicating a completion of an operation corresponding to a fetched command. For example, after completing an operation corresponding to a specific command, the storage controller 210 may transmit an I/O completion corresponding to the specific command to a corresponding host. In this case, a timing to transmit the I/O completion to the corresponding host may be managed by the completion manager 211d. When the operation corresponding to the specific command is completed, the completion manager 211d may selectively transmit the I/O completion to the corresponding host, based on a token management table TMT.

In detail, as illustrated in FIG. 14, the token management table TMT may include information TKU1, TKU2, and TKU3 about token units of the plurality of physical functions PF1, PF2, and PF3, reference time information T1, T2, and T3, and information "a", "b", and "c" about the number of tokens. In this case, it is assumed that the maximum performance of the first physical function PF1 is 1000 MB/s, a first token unit TKU1 corresponding to the first physical function PF1 is 4 KB, and a reference time T1 is 1 ms. In this case, the first number "a" of tokens corresponding to the first physical function PF1 may be set to "250". In an exemplary embodiment, the token unit may indicate a minimum input/output unit supported by a corresponding physical function or a multiple of the minimum input/output unit.

In the case where a command associated with the first physical function PF1 is completed, the completion manager 211d may determine whether a token of the first physical function PF1 corresponding to the completed command remains, based on the token management table TMT. In the case where a remaining token exists, the completion manager 211d may transmit an input/output completion token to a host (e.g., 11) corresponding to the first physical function PF1 and may subtract the number of tokens corresponding to a size (e.g., an input/output size) of the transmitted input/output completion from the number of tokens of the token management table TMT. In other words, in the case where an input/output size of the completed command associated with the first physical function PF1 is 4 KB, the completion manager 211d may decrease the number of tokens of the token management table TMT associated with the first physical function PF1 by "1".

In the case where a remaining token exists or in the case where the number of remaining tokens is less than the number of tokens corresponding to the size of the input/output completion, the completion manager 211d may not transmit the input/output completion to the corresponding host. For example, that a token associated with the first physical function PF1 is absent from the token management table TMT may mean that performance of the first physical function PF1 reaches or comes close to the maximum performance. That is, in the case where a remaining token exists or in the case where the number of remaining tokens is less than the number of tokens corresponding to the size of the input/output completion, the completion manager 211d may not transmit the input/output completion to the corresponding host, and thus, performance of the first physical function PF1 may be prevented from exceeding the maximum performance. In other words, as the completion manager 211d controls a timing to transmit the input/output completion based on the token management table TMT, performance of each of a plurality of hosts may be limited to the given maximum performance.

Like the above description, the number "b" of tokens associated with the physical function PF2 may be determined based on the maximum performance of the physical function PF2, a token unit TKU2, and a reference time T2, the number "c" of tokens associated with the physical function PF3 may be determined based on the maximum performance of the physical function PF3, a token unit TKU3, and a reference time T3, and the completion manager 211d may limit the maximum performance of each of the physical functions PF2 and PF3 based on the token management table TMT.

In an exemplary embodiment, that the input/output completion is not transmitted may mean that an interrupt is not transmitted to the corresponding host. For example, the storage controller 210 may write the input/output completion in a corresponding completion queue and may transmit the interrupt to the corresponding host. In this case, the interrupt may be a signal indicating that the input/output completion is written in the corresponding completion queue. In response to the interrupt, the corresponding host may recognize that the input/output completion is written in the completion queue and may perform a corresponding operation. That is, in the case where the storage controller 210 does not transmit the interrupt to the corresponding host, the corresponding host may fail to process an operation associated with the input/output completion. Accordingly, as the storage controller 210 does not transmit the interrupt to the corresponding host, performance of the corresponding host may be limited. In other words, the storage controller 210 may control a timing to transmit the input/output completion by adjusting a timing to transmit the interrupt to the corresponding host.

In an exemplary embodiment, that the input/output completion is not transmitted may mean that the input/output completion is not written in the corresponding completion queue. That is, the storage controller 210 may control a timing to transmit the input/output completion by controlling a timing to transmit the input/output completion in the corresponding completion queue.

The timer 211e may be configured to count a given time. For example, the timer 211e may be configured to count a system clock or an operating clock to count a time elapsed from a specific time point or a given time interval. In an exemplary embodiment, the timer 211e may be configured to count reference times (e.g., the reference time information T1, T2, and T3 included in the token management table TMT) of a plurality of physical functions.

In an exemplary embodiment, in the case where the timer 211e expires with regard to a specific physical function (e.g., PF1) (in other words, in the case where the first reference time T1 of the first physical function PF1 elapses from the specific time point), the completion manager 211d may refill the number "a" of tokens of the first physical function PF1 included in the token management table TMT.

As described above, the performance manager 211 may selectively transmit the input/output completion associated with the specific command to the corresponding host based on the token management table TMT. Performance of the corresponding host may be limited (e.g., to the maximum performance or lower) by adjusting a timing to transmit the input/output completion.

Figure 15:
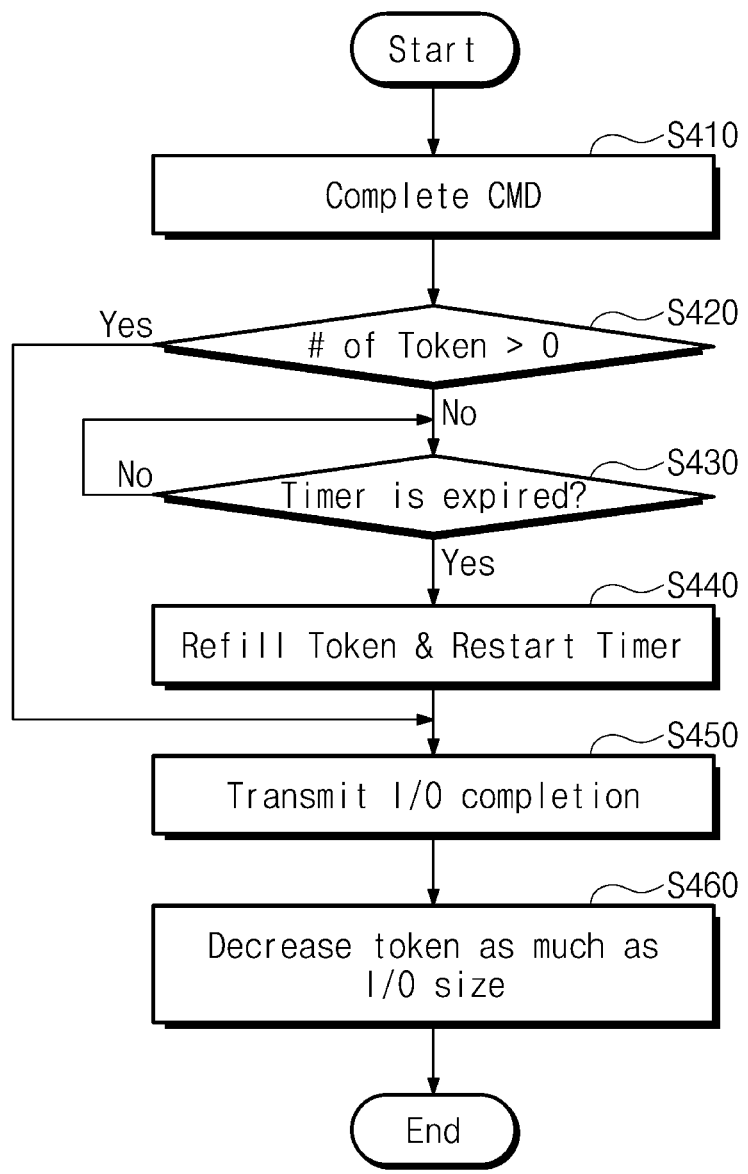
FIG. 15 is a flowchart illustrating an operating method of a storage controller of FIG. 13.

FIG. 15 is a flowchart illustrating an operating method of a storage controller of FIG. 13. A maximum performance limiting operation of the storage controller 210 will described with reference to FIG. 15. However, the inventive concept is not limited thereto. For example, as described with reference to FIGS. 1 to 12C, the storage controller 210 may perform command scheduling (i.e., an operation of securing the minimum performance of each of a plurality of hosts or a WFQ scheduling method), based on aggregated values respectively associated with the plurality of physical functions PF or the plurality of submission queues SQ.

Referring to FIGS. 13 to 15, in operation S410, the storage controller 210 may complete the command CMD. For example, based on the method described with reference to FIGS. 1 to 12C, the storage controller 210 may fetch a command from a specific submission queue and may process the fetched command.

In operation S420, the storage controller 210 may determine whether the number of remaining tokens of the physical function PF corresponding to the processed command is more than "0", based on the token management table TMT. In an exemplary embodiment, a reference value of "0" may be replaced with the number corresponding to an input/output size of the processed command.

When the number of remaining tokens is more than "0" (or is more than the number corresponding to the input/output size of the processed command), the storage controller 210 may perform operation S450.

When the number of remaining tokens is "0" (or the number corresponding to the input/output size of the processed command), the storage controller 210 may determine whether a timer expires with regard to a physical function corresponding to the processed command. For example, the storage controller 210 may determine whether a reference time elapses from a specific time point, with regard to the physical function corresponding to the processed command. When it is determined that the timer does not expire, the storage controller 210 may continue operation S430.

When it is determined that the timer expires, in operation S440, the storage controller 210 may refill the number of tokens of the physical function corresponding to the processed command.

In operation S450, the storage controller 210 may transmit an input/output completion corresponding to the completed command to a corresponding host. For example, the storage controller 210 may write the input/output completion in a corresponding completion queue and may transmit an interrupt to the corresponding host.

In operation S460, the storage controller 210 may decrease the number of tokens of the token management table TMT by an input/output size of the input/output completion. For example, it is assumed that the input/output completion corresponds to a command of the first physical function PF1 and has an input/output size of 16 KB. Under the assumption, in the case where a token unit of the first physical function PF1 is 4 KB, the storage controller 210 may decrease "4" tokens (i.e., 16 KB/4 KB=4) at the token management table TMT. As described above, the storage controller 210 according to an embodiment of the inventive concept may manage a token of each of the plurality of physical functions PF through the token management table TMT. The storage controller 210 may control a timing to transmit an input/output completion, based on the number of tokens remaining in the token management table TMT. That is, in the case where a token of a specific physical function is absent from the token management table TMT or in the case where a token is insufficient, the storage controller 210 may not transmit an input/output completion associated with the specific physical function to the corresponding host. After a timer expires with regard to the specific physical function, the storage controller 210 may refill a token of the specific physical function at the token management table TMT and may then resume the transmission of the input/output completion. Accordingly, performance of a specific physical function or a specific host may be prevented from exceeding given performance (i.e., the maximum performance thereof may be limited).

Figure 16A:
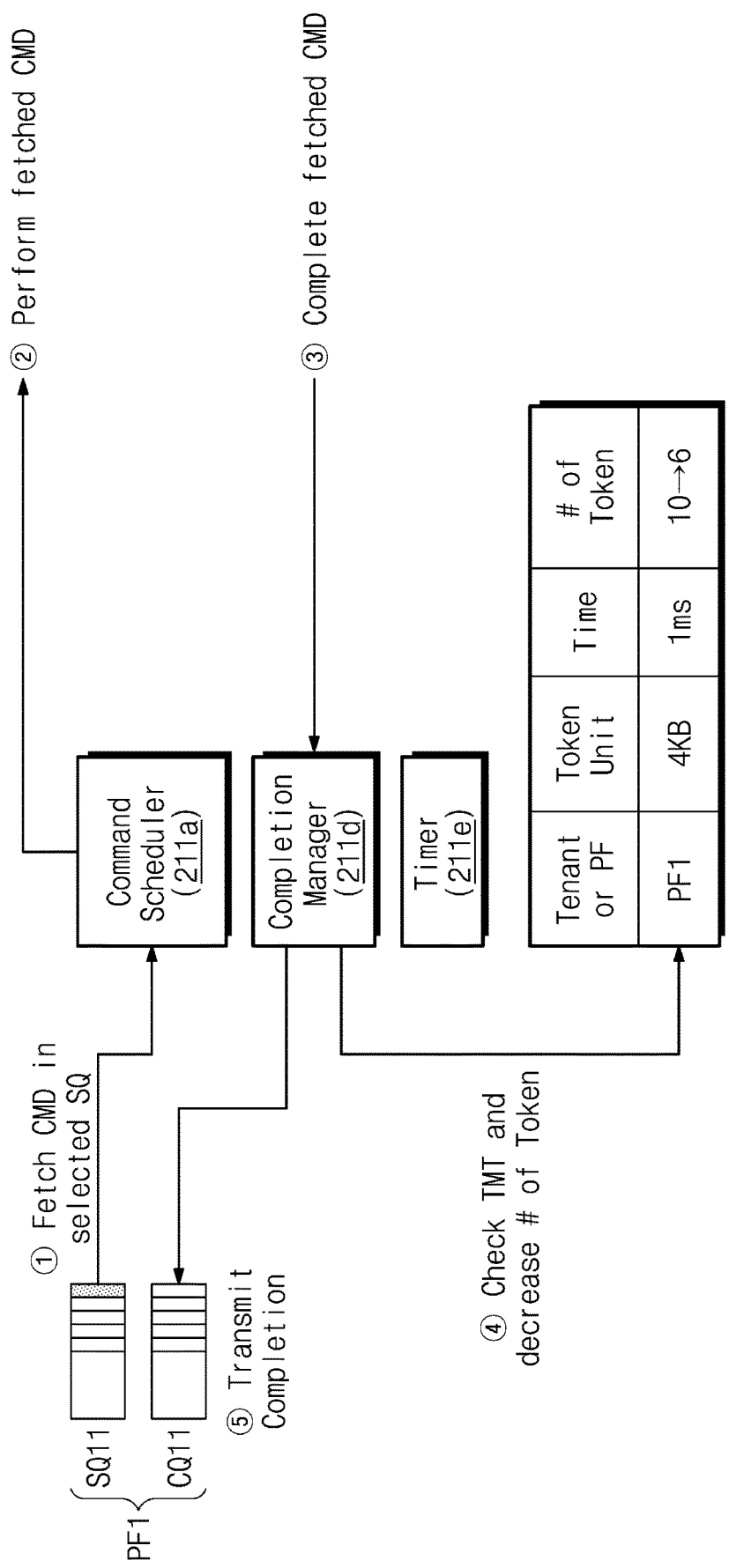
FIGS. 16A and 16B are diagrams for describing an operation of a storage controller of FIG. 13.
Figure 16B:
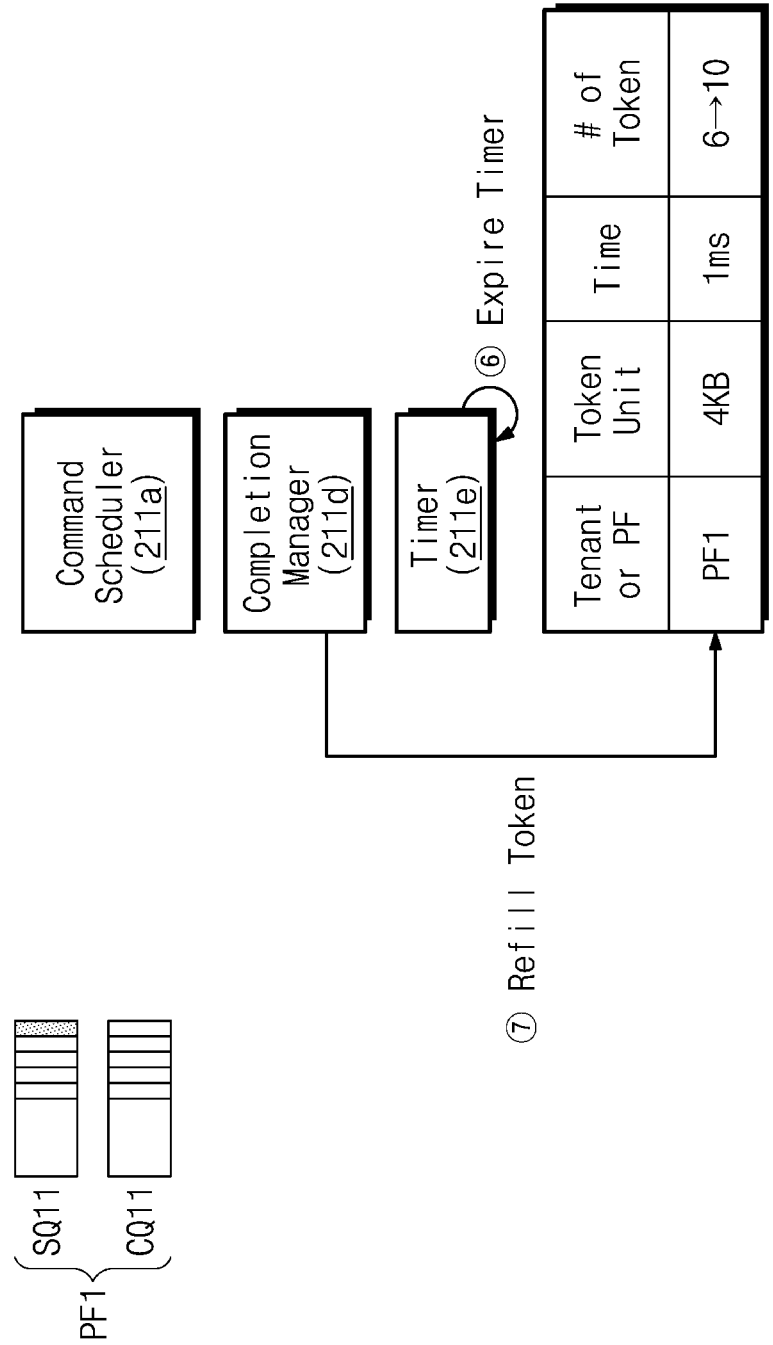

FIGS. 16A and 16B are diagrams for describing an operation of a storage controller of FIG. 13. For convenience of description, an operation of limiting performance of a specific host (e.g., a host corresponding to the first physical function PF1) will be described. However, the inventive concept is not limited thereto. For example, the storage controller 210 may be configured to limit performance of each of any other hosts, based on a method to be described with reference to FIGS. 16A and 16B.

Referring to FIGS. 13 and 16A, in operation ①, the command scheduler 211a may fetch a command from the submission queue SQ11 corresponding to the first physical function PF1. In an exemplary embodiment, the command scheduler 211a may select the submission queue SQ11 based on the method (e.g., a method of securing minimum performance by using an aggregated value or a WFQ scheduling method) described with reference to FIGS. 1 to 12C and may fetch the command CMD from the selected submission queue SQ11. Although not illustrated in drawing, as described with reference to FIGS. 1 to 12C, as the command CMD is fetched from the submission queue SQ11, aggregated values of the submission queue SQ11 and the first physical function PF1 may be updated.

In operation ②, the fetched command may be processed. In operation ③, an operation corresponding to the fetched command may be completed. In operation ④, the completion manager 211d may check the number of remaining tokens of the first physical function PF1 corresponding to the fetched command CMD. In the embodiment of FIG. 16A, the number of remaining tokens of the first physical function PF1 may be "10". In this case, because a remaining token exists, the completion manager 211d may decrease the number of remaining tokens of the first physical function PF1 by a size of an input/output completion (i.e., an input/output size of the processed command). For example, in the case where a token unit of the first physical function PF1 is 4 KB and a size of the input/output completion is 16 KB, the number of tokens of the first physical function PF1 in the token management table TMT may decrease from "10" to "6".

In operation ⑤, the completion manager 211d may transmit the input/output completion to a corresponding host. For brevity of illustration, an example is illustrated in FIG. 16A as the input/output completion is written in a completion queue CQ11, but the inventive concept is not limited thereto. For example, as described above, the completion manager 211d may write the input/output completion in the completion queue CQ11 and may transmit an interrupt to the corresponding host.

Next, as illustrated in FIG. 16B, in operation ⑥, the timer 211e may expire. For example, the timer 211e may be configured to count a reference time (e.g., 1 ms) of the first physical function PF1. That the timer 211e expires may mean that the reference time (e.g., 1 ms) elapses from a specific time point (e.g., a time point at which the timer 211e initiates counting).

In the case where the timer 211e of the first physical function PF1 expires, in operation ⑦, the completion manager 211d may refill the number of tokens of the token management table TMT associated with the first physical function PF1. For example, the number of tokens of the first physical function PF1 is in a state of decreasing from "10" to "6" through the operation of FIG. 16A. The completion manager 211d may refill the number of tokens of the first physical function PF1 in the token management table TMT from "6" to "10". In an exemplary embodiment, the number of tokens to be refilled may be determined based on maximum performance of a corresponding physical function, a token unit, and a reference time.

In an exemplary embodiment, after a token(s) of the corresponding physical function is refilled, the timer 211e may resume a counting operation.

Figure 17:
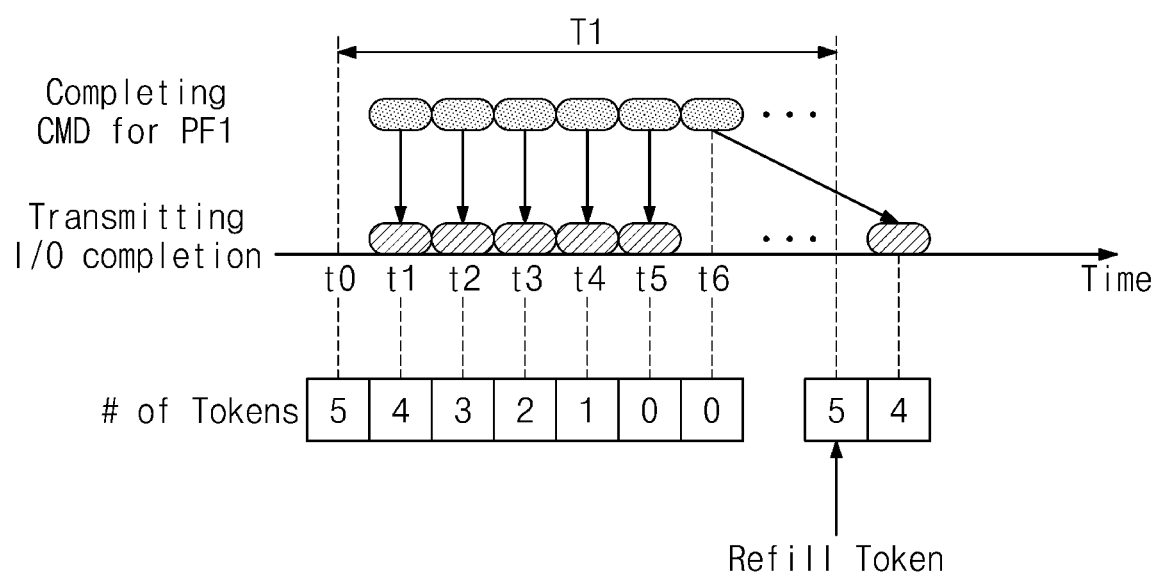
FIG. 17 is a timing diagram for describing an operation of a storage controller of FIG. 13.

FIG. 17 is a timing diagram for describing an operation of a storage controller of FIG. 13. For convenience of description, it is assumed that the storage controller 210 continues to process commands associated with the first physical function PF1, the number of tokens of the first physical function PF1 is "5", and one command has an input/output size corresponding to one token unit. That is, one input/output completion corresponding to processing of one command may correspond to one token.

Referring to FIGS. 13 and 17, at a 0-th time t0, the timer 211e may initiate counting. At the 0-th time t0, the number of tokens of the first physical function PF1 may be "5". At a first time t1, one command associated with the first physical function PF1 may be completely processed. In response to that the command is completely processed, the storage controller 210 may transmit one input/output completion to a corresponding host and may decrease the number of tokens of the first physical function PF1 by "1" (i.e., 5→4). Afterwards, at each of second to fifth times t2, t3, t4, and t5, one command may be completely processed; whenever the command is completely processed, the storage controller 210 may transmit one input/output completion to the corresponding host and may decrease the number of tokens of the first physical function PF1 by "1" (i.e., 4→3→2→1→0). At the fifth time t5, the number of remaining tokens of the first physical function PF1 may be "0". That is, that all tokens of the first physical function PF1 are used during a time interval from the first time t1 to the fifth time t5 may mean that performance of the first physical function PF1 reaches the maximum performance.

At a sixth time t6, one command associated with the first physical function PF1 may be completely processed. In this case, at the sixth time t6, the number of remaining tokens of the first physical function PF1 may be "0". That is, because all tokens of the first physical function PF1 are used during a time interval from the first time t1 to the fifth time t5, the storage controller 210 may not transmit an input/output completion associated with the command completely processed at the sixth time t6 to the host or may not transmit an interrupt associated with the input/output completion to the host.

Afterwards, when the first reference time T1 elapses from the 0-th time t1 (i.e., a timer expires with regard to the first physical function PF1), the storage controller 210 may refill a token(s) for the first physical function PF (i.e., 0→5). After token refilling is performed on the first physical function PF1, the storage controller 210 may transmit the input/output completion associated with the command completely processed at the sixth time t6 to the host. As such, the number of tokens of the first physical function PF1 may decrease by "1" (i.e., 5→4).

As described above, the storage controller 210 according to an embodiment of the inventive concept may limit performance of each of a plurality of hosts respectively corresponding to a plurality of physical functions to the maximum performance or lower, by managing tokens of the plurality of physical functions. In this case, a resource of a storage device may be prevented from being occupied by a specific host, and thus, performance of the plurality of hosts may be distributed uniformly or evenly.

FIG. 18 is a diagram for describing a configuration to receive performance information of FIG. 4. For brevity of illustration, indexes of minimum performance and maximum performance of each of the first to third physical functions PF1, PF2, and PF3 are illustrated in FIG. 18, but the inventive concept is not limited thereto. For example, performance indexes of any other hosts or any other physical functions may be used.

Referring to FIGS. 1 and 18, the plurality of hosts 11 to 1n may provide the storage device 100 with the performance information or the performance indexes illustrated in FIG. 18. For example, the first host 11 may correspond to the first physical function PF1, and the first host 11 may provide the storage device 100 with information about the minimum performance and the maximum performance of the first physical function PF1. Likewise, the second and third hosts 12 and 13 may respectively correspond to the second and third physical functions PF2 and PF3, and the second and third hosts 12 and 13 may provide the storage device 100 with information about the minimum performance and the maximum performance of the second and third physical functions PF2 and PF3, respectively.

In an exemplary embodiment, the minimum performance information may include information about sequential write minimum performance SW_min1 to SW_min3, sequential read minimum performance SR_min1 to SR_min3, random write minimum performance RW_min1 to RW_min3, and random read minimum performance RR_min1 to RR_min3 of the first to third physical functions PF1 to PF3. The maximum performance information may include information about sequential write maximum performance SW_max1 to SW_max3, sequential read maximum performance SR_max1 to SR_max3, random write maximum performance RW_max1 to RW_max3, and random read maximum performance RR_max1 to RR_max3 of the first to third physical functions PF1 to PF3.

In an exemplary embodiment, the minimum performance information or the maximum performance information may be provided from each of the plurality of hosts 11 to 1n to the storage device 100 through a "set features" command or vendor commands.

In an exemplary embodiment, the storage controller 110 or 210 according to an embodiment of the inventive concept may perform the method (i.e., command scheduling or WFQ scheduling using an aggregated value) described with reference to FIGS. 1 to 12C based on the information about the minimum performance illustrated in FIG. 18. For example, it is assumed that the sequential write minimum performance SW_min1 corresponding to the first physical function PF1 is 3000 MB/s, the sequential write minimum performance SW_min2 corresponding to the second physical function PF2 is 1500 MB/s, and maximum performance that the storage device 100 provides is 6 GB/s. In this case, weights (e.g., write weights) of the first and second physical functions PF1 and PF2 may be respectively set to "2" and "4" (i.e., a ratio of the weights of the first and second physical functions PF1 and PF2 may be set to 2:1). In this case, a frequency at which a command is fetched by the first physical function PF1 having a relatively small weight may be relatively high. Accordingly, the minimum performance of each of the first and second physical functions PF1 and PF2 may be secured.

Alternatively, the storage controller 110 or 210 according to an embodiment of the inventive concept may perform the method (i.e., the method of limiting maximum performance through token management) described with reference to FIGS. 13 to 17 based on the information about the maximum performance illustrated in FIG. 18. For example, it is assumed that a reference time of the first and second physical functions PF1 and PF2 is 1 ms, a token unit is 4 KB, the sequential write maximum performance SW_max1 of the first physical function PF1 is 4000 MB/s, and the sequential write maximum performance SW_max2 of the second physical function PF2 is 2000 MB/s. In this case, the initial number of tokens of the first physical function PF1 may be set to "1000", and the initial number of tokens of the second physical function PF2 may be set to "500". That is, the maximum performance corresponding to each of the first and second physical functions PF1 and PF2 may be limited by differently setting the initial numbers of tokens of the first and second physical functions PF1 and PF2.

Figure 19:
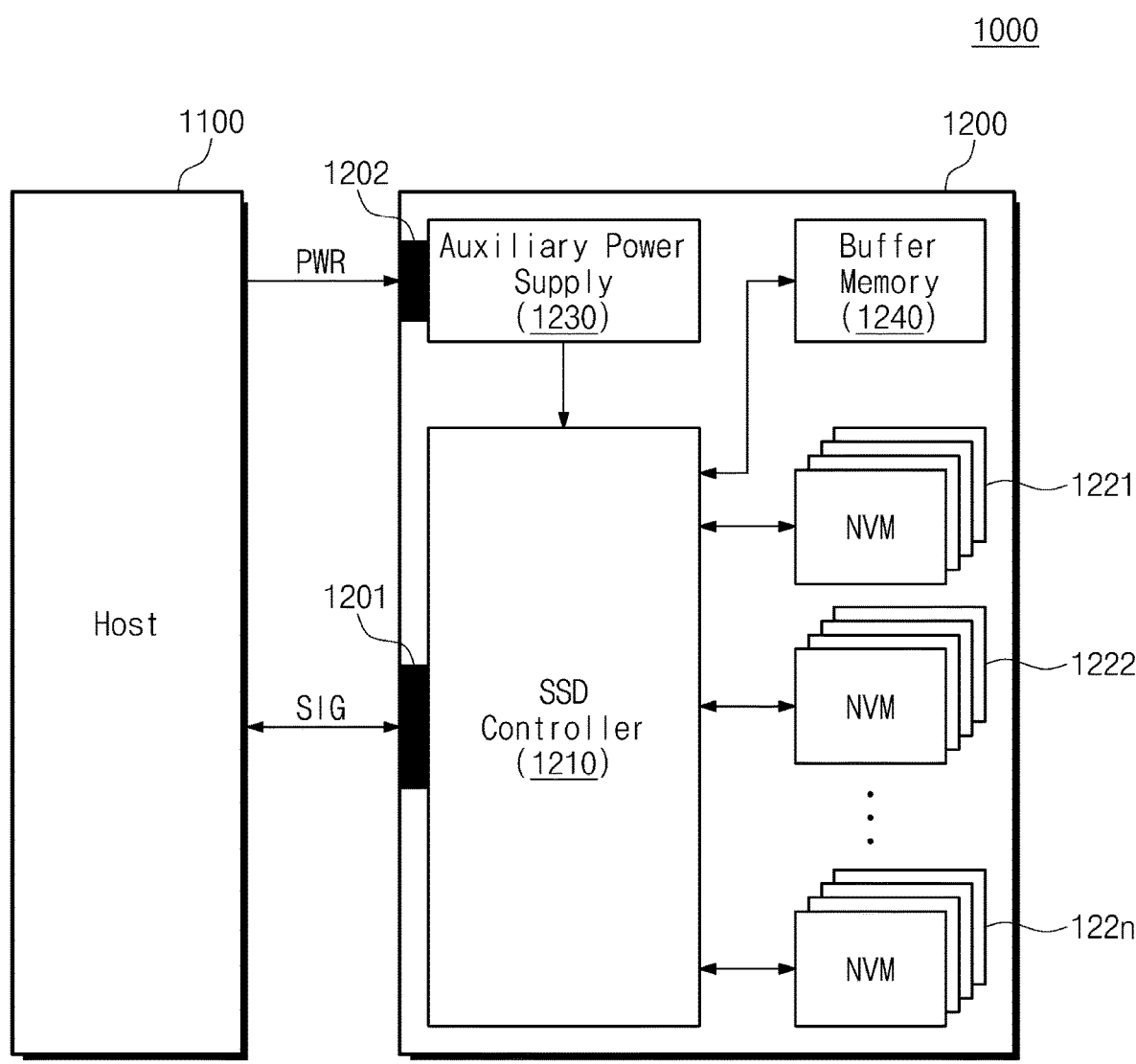
FIG. 19 is a block diagram illustrating an SSD system to which a storage system according to the inventive concept is applied.

FIG. 19 is a block diagram illustrating an SSD system to which a storage system according to the inventive concept is applied. Referring to FIG. 19, an SSD system 1000 may include a host 1100 and a storage device 1200. The storage device 1200 may exchange signals SIG with the host 1100 through a signal connector 1201 and may be supplied with a power PWR through a power connector 1202. The storage device 1200 includes a solid state drive (SSD) controller 1210, a plurality of nonvolatile memories 1221 to 122n, an auxiliary power supply 1230, and a buffer memory 1240.

The SSD controller 1210 may control the plurality of nonvolatile memories 1221 to 122n in response to the signals SIG received from the host 1100. The plurality of nonvolatile memories 1221 to 122n may operate under control of the SSD controller 1210. The auxiliary power supply 1230 is connected with the host 1100 through the power connector 1202. The auxiliary power supply 1230 may be charged by the power PWR supplied from the host 1100. When the power PWR is not smoothly supplied from the host 1100, the auxiliary power supply 1230 may power the storage device 1200.

The buffer memory 1240 may be used as a buffer memory of the storage device 1200. In an exemplary embodiment, the buffer memory 1240 may be used as the controller memory buffer CMB of the storage device 100 described with reference to FIGS. 1 to 19.

In an exemplary embodiment, the host 1100 may be a multi-host or multi-tenant described with reference to FIGS. 1 to 12C, the storage device 1200 may be the storage device 100 described with reference to FIGS. 1 to 12C or may schedule commands of the host 1100 (or a multi-host) based on the operation methods described with reference to FIGS. 1 to 12C.

Figure 20:
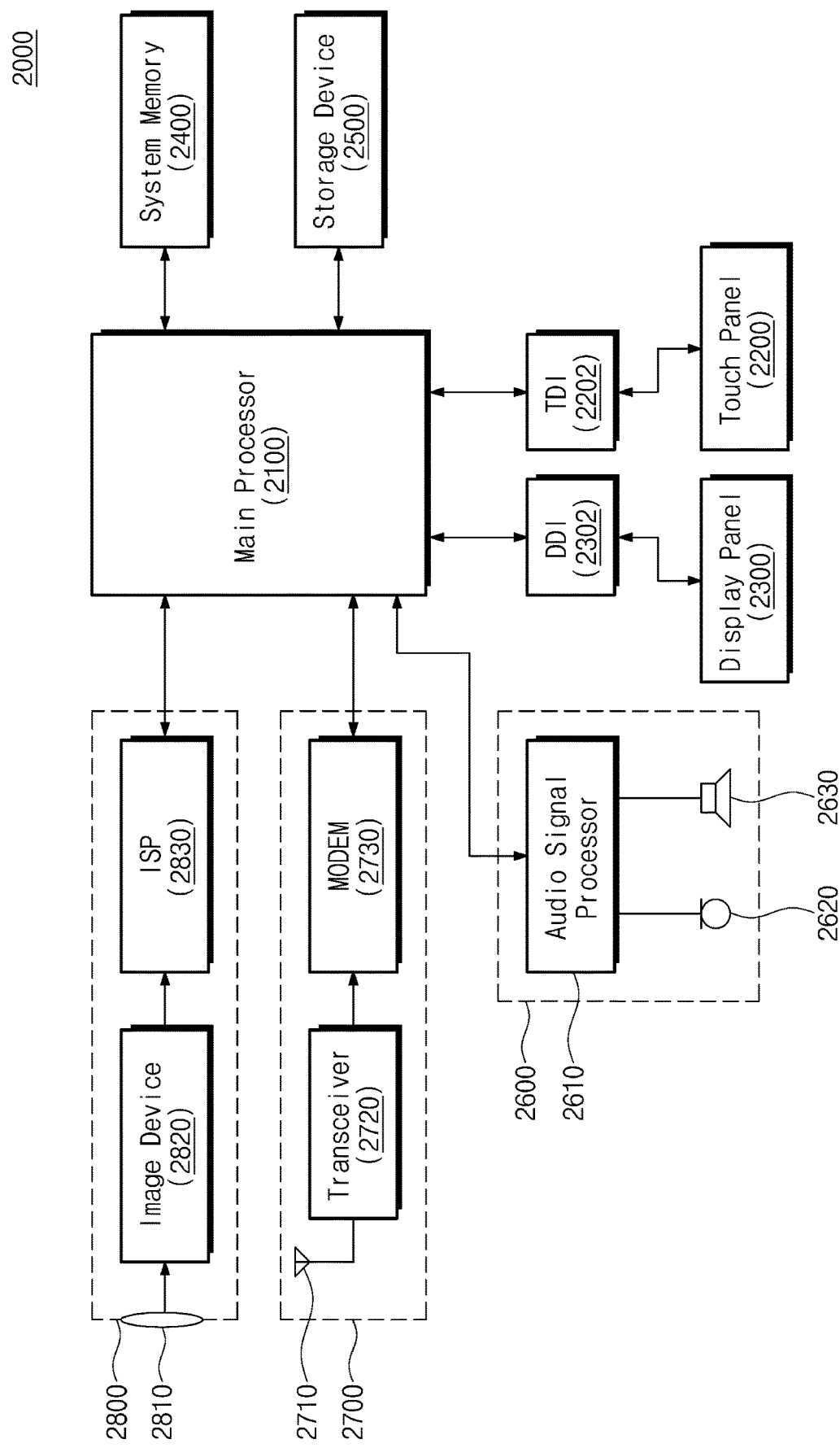
FIG. 20 is a block diagram illustrating an electronic device to which a storage system according to the inventive concept is applied.

FIG. 20 is a block diagram illustrating an electronic device to which a storage system according to the inventive concept is applied. Referring to FIG. 20, an electronic device 2000 may include a main processor 2100, a touch panel 2200, a touch driver integrated circuit 2202, a display panel 2300, a display driver integrated circuit 2302, a system memory 2400, a storage device 2500, an audio processor 2600, a communication block 2700, and an image processor 2800. In an exemplary embodiment, the electronic device 2000 may be one of various electronic devices such as a personal computer, a laptop computer, a server, a workstation, a portable communication terminal, a personal digital assistant (PDA), a portable media player (PMP), a digital camera, a smartphone, a tablet computer, and a wearable device.

The main processor 2100 may control overall operations of the electronic device 2000. The main processor 2100 may control/manage operations of the components of the electronic device 2000. The main processor 2100 may process various operations for the purpose of operating the electronic device 2000.

The touch panel 2200 may be configured to sense a touch input from a user under control of the touch driver integrated circuit 2202. The display panel 2300 may be configured to display image information under control of the display driver integrated circuit 2302.

The system memory 2400 may store data that are used for an operation of the electronic device 2000. For example, the system memory 2400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 2500 may store data regardless of whether a power is supplied. For example, the storage device 2500 may include at least one of various nonvolatile memories such as a flash memory, a PRAM, an MRAM, a ReRAM, and a FRAM. For example, the storage device 2500 may include an embedded memory and/or a removable memory of the electronic device 2000.

The audio processor 2600 may process an audio signal by using an audio signal processor 2610. The audio processor 2600 may receive an audio input through a microphone 2620 or may provide an audio output through a speaker 2630.

The communication block 2700 may exchange signals with an external device/system through an antenna 2710. A transceiver 2720 and a modulator/demodulator (MODEM) 2730 of the communication block 2700 may process signals exchanged with the external device/system, based on at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The image processor 2800 may receive a light through a lens 2810. An image device 2820 and an image signal processor 2830 included in the image processor 2800 may generate image information about an external object, based on a received light.

In an exemplary embodiment, the storage device 2500 may be the storage device 100 described with reference to FIGS. 1 to 12C and may support a multi-host or multi-tenant. For example, based on the operation method described with reference to FIGS. 1 to 12C, the storage device 2500 may satisfy performance requirements on a plurality of cores included in the main processor 2100 or may satisfy performance requirements on a plurality of processes executable by the main processor 2100. Alternatively, the storage device 2500 may communicate with an external device or an external host through the communication block 2700 and may satisfy performance requirements on the main processor 2100, the external device, or the external host based on the method described with reference to FIGS. 1 to 12C.

Figure 21:
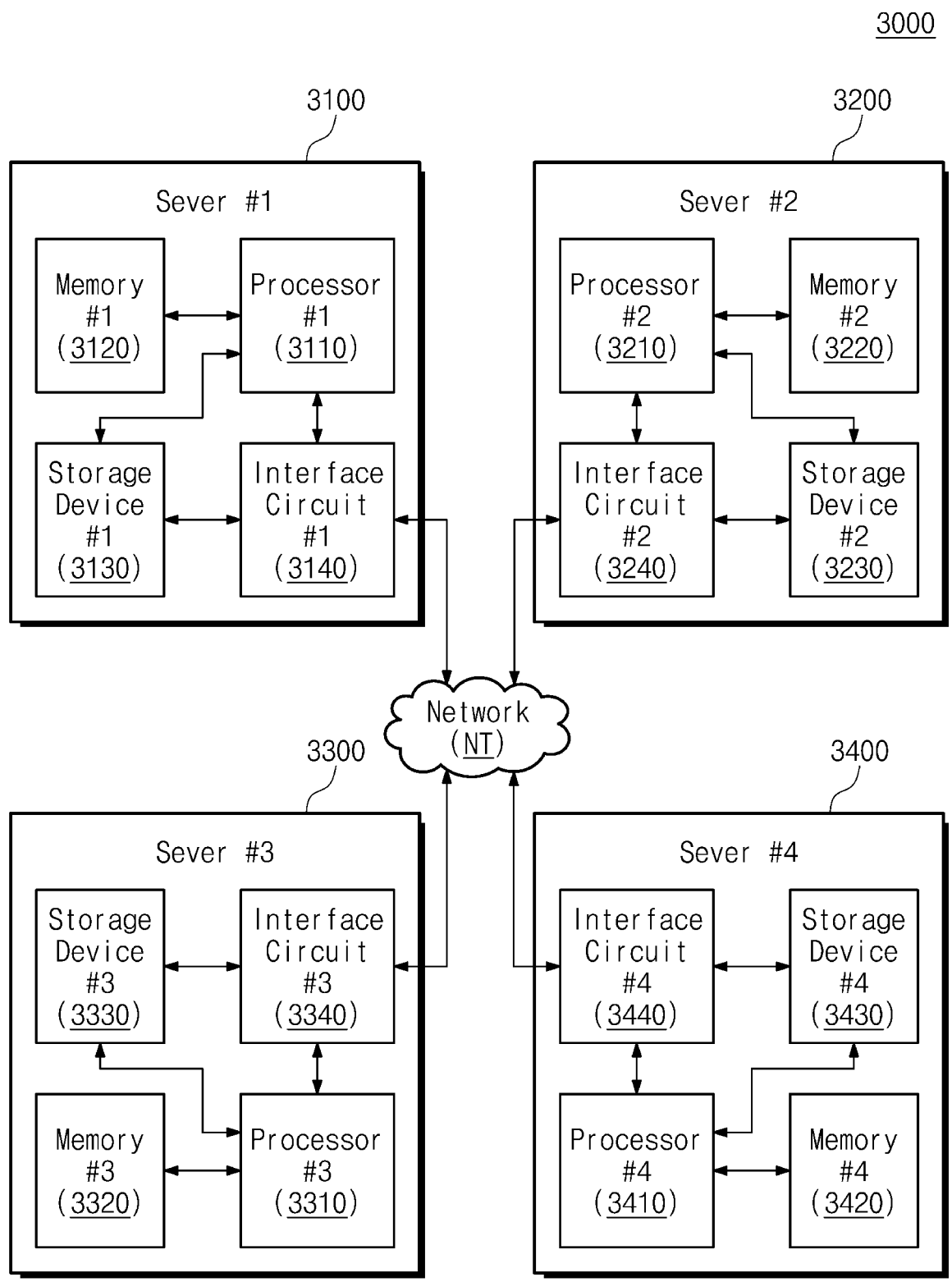
FIG. 21 is a block diagram illustrating a data center to which a storage system according to an embodiment of the inventive concept is applied.

FIG. 21 is a block diagram illustrating a data center to which a storage system according to an embodiment of the inventive concept is applied. Referring to FIG. 21, a data center 3000 may include a plurality of computing nodes (or servers) 3100 to 3400. The plurality of computing nodes 3100 to 3400 may communicate with each other over a network NT. In an exemplary embodiment, the network NT may be a storage dedicated network such as a storage area network (SAN) or may be an Internet network such as TCP/IP. In an exemplary embodiment, the network NT may include at least one of various communication protocols such as Fibre channel, iSCSI protocol, FCoE, NAS, and NVMe-oF.

The plurality of computing nodes 3100 to 3400 may include processors 3110, 3210, 3310, and 3410, memories 3120, 3220, 3320, and 3420, storage devices 3130, 3230, 3330, and 3430, and interface circuits 3140, 3240, 3340, and 3440.

For example, the first computing node 3100 may include the first processor 3110, the first memory 3120, the first storage device 3130, and the first interface circuit 3140. In an exemplary embodiment, the first processor 3110 may be implemented with a single core or a multi-core. The first memory 3120 may include a memory such as a DRAM, an SDRAM, an SRAM, a 3D XPoint memory, an MRAM, a PRAM, a FeRAM, or a ReRAM. The first memory 3120 may be used as a system memory, a working memory, or a buffer memory of the first computing node 3100. The first storage device 3130 may be a high-capacity storage medium such as a hard disk drive (HDD) or a solid state drive (SSD). The first interface circuit 3140 may be a network interface controller (NIC) configured to support communication over the network NT.

In an exemplary embodiment, the first processor 3110 of the first computing node 3100 may be configured to access the first memory 3120 based on a given memory interface. Alternatively, in an embodiment of a shared memory architecture, the first processor 3110 of the first computing node 3100 may be configured to access the memories 3220, 3320, and 3420 of the remaining computing nodes 3200, 3300, and 3400 over the network NT. The first interface circuit 3140 may include a network switch (not illustrated) configured to control or support an access to a shared memory (i.e., memories of any other computing nodes).

In an exemplary embodiment, the first processor 3110 of the first computing node 3100 may be configured to access the first storage device 3130 based on a given storage interface. Alternatively, the first processor 3110 of the first computing node 3100 may be configured to access the storage devices 3230, 3330, and 3430 of the remaining computing nodes 3200, 3300, and 3400 over the network NT. The first interface circuit 3140 may include a network switch (not illustrated) configured to control or support an access to storage devices of any other computing nodes. In an exemplary embodiment, the storage devices 3130 to 3430 respectively included in the plurality of computing nodes 3100 to 3140 may constitute one RAID volume. Operations of the second to fourth computing nodes 3200 to 3400 may be similar to the operation of the first computing node 3100 described above, and thus, additional description will be omitted to avoid redundancy.

In an exemplary embodiment, various applications may be executed at the data center 3000. The applications may be configured to execute an instruction for data movement or copy between the computing nodes 3100 to 3400 or may be configured to execute instructions for combining, processing, or reproducing a variety of information present on the computing nodes 3100 to 3400. In an exemplary embodiment, the applications may be executed by one of the plurality of computing nodes 3100 to 3400 included in the data center 3000, or the applications may be distributed and executed between the plurality of computing nodes 3100 to 3400.

In an exemplary embodiment, the data center 3000 may be used for high-performance computing (HPC) (e.g., finance, petroleum, materials science, meteorological prediction), an enterprise application (e.g., scale out database), a big data application (e.g., NoSQL database or in-memory replication).

In an exemplary embodiment, at least one of the plurality of computing nodes 3100 to 3400 may be an application server. The application server may be configured to execute an application configured to perform various operations at the data center 3000. At least one of the plurality of computing nodes 3100 to 3400 may be a storage server. The storage server may be configured to store data that are generated or managed at the data center 3000.

In an exemplary embodiment, the plurality of computing nodes 3100 to 3400 included in the data center 3000 or portions thereof may be present at the same site or at sites physically separated from each other and may communicate with each other over network NT based on the wireless communication or wired communication based network NT. In an exemplary embodiment, the plurality of computing nodes 3100 to 3400 included in the data center 3000 may be implemented by the same memory technology or may be implemented by different memory technologies.

Although not illustrated in drawing, at least a part of the plurality of computing nodes 3100 to 3400 of the data center 3000 may communicate with an external client node (not illustrated) over the network NT or over any other communication interface (not illustrated). At least a part of the plurality of computing nodes 3100 to 3400 may automatically process a request (e.g., data store or data transfer) depending on a request of the external client node or may process the request at any other computing node.

In an exemplary embodiment, the number of computing nodes 3100 to 3400 included in the data center 3000 is exemplary, and the inventive concept is not limited thereto. Also, in each computing node, the number of processors, the number of memories, and the number of storage devices are exemplary, and the inventive concept is not limited thereto.

In an exemplary embodiment, the plurality of computing nodes 3100 to 3400 may be the plurality of hosts described with reference to FIGS. 1 to 12C, and each of the storage devices 3130 to 3430 respectively included in the plurality of computing nodes 3100 to 3400 may be a storage device configured to support a multi-host or multi-tenant described with reference to FIGS. 1 to 12C. Based on the operation method described with reference to FIGS. 1 to 19, each of the storage devices 3130 to 3430 respectively included in the plurality of computing nodes 3100 to 3400 may be configured to secure the minimum performance of each of the plurality of computing nodes 3100 to 3400 and to limit the maximum performance.

According to the inventive concept, a storage device may secure minimum performance of each of a plurality of hosts. Alternatively, the storage device may prevent a specific host from occupying a physical resource of the storage device by limiting maximum performance corresponding to performance of each of the plurality of hosts. Accordingly, a storage device having improved performance and an operation method of the storage device are provided.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. An operation method of a storage device which includes a first physical function and a second physical function respectively corresponding to a first host and a second host, the method comprising:
   receiving first performance information and second performance information from the first host and the second host, respectively;
   setting first weight information corresponding to the first physical function and second weight information corresponding to the second physical function, based on the first performance information and the second performance information, respectively;
   selecting a submission queue from a plurality of submission queues based on an aggregated value table,
   wherein a first group of submission queues among the plurality of submission queues and a second group of submission queues among the plurality of submission queues are managed by the first host and the second host, respectively, and
   wherein the first group of submission queues and the second group of submission queues are accessed by the first physical function and the second physical function, respectively;
   performing a memory operation corresponding to a command fetched from the submission queue, selected from the plurality of submission queues, using one of the first physical function and the second physical function which accessed the submission queue among the plurality of submission queues; and
   updating an entry of the aggregated value table based on weight information, among the first weight information and the second weight information, corresponding to the one of the first physical function and the second physical function which performed the memory operation and input/output (I/O) information processed by the command.

2. The method of claim 1,
   wherein the I/O information includes information about a size of data processed by the command.

3. The method of claim 1,
   wherein the aggregated value table includes a plurality of entries for the plurality of submission queues,
   wherein the first group of submission queues includes a first submission queue and a second submission queue,
   wherein the second group of submission queues includes a third submission queue and a fourth submission queue,
   wherein the plurality of entries of the aggregated value table includes:
   a first entry storing a first submission queue aggregated value aggregated based on I/O information of at least one first command, which is received from the first submission queue and is then processed, and the first weight information;
   a second entry storing a second submission queue aggregated value aggregated based on I/O information of at least one second command, which is received from the second submission queue and is then processed, and the first weight information;
   a third entry storing a third submission queue aggregated value aggregated based on I/O information of at least one third command, which is received from the third submission queue and is then processed, and the second weight information; and
   a fourth entry storing a fourth submission queue aggregated value aggregated based on I/O information of at least one fourth command, which is received from the fourth submission queue and is then processed, and the second weight information.

4. The method of claim 3,
   wherein each of the plurality of entries in the aggregated value table further includes one of a first physical function aggregated value and a second physical function aggregated value,
   wherein the first physical function aggregated value is updated based on the first weight information and I/O information processed by a command selected from the first group of submission queues, which is received from the first host corresponding to the first physical function, and
   wherein the second physical function aggregated value is updated based on the second weight information and I/O information processed by a command selected from the second group of submission queues, which is received from the second host corresponding to the second physical function.

5. The method of claim 4,
   wherein the selecting of the submission queue of the plurality of submission queues includes:
   selecting a physical function having a lowest physical function aggregated value from among the first physical function and the second physical function; and
   selecting the submission queue with a lowest submission queue aggregated value, from among one of the first group of submission queues and the second group of submission queues, corresponding to the physical function having the minimum physical function aggregated value.

6. The method of claim 5,
   wherein the updating of the entry of the aggregated value table includes:
   adding a product of weight information corresponding to the physical function having the minimum physical function aggregated value and I/O information processed by the command fetched from the submission queue to a submission queue aggregated value corresponding to the submission queue selected from the plurality of submission queues; and adding a product of weight information corresponding to the physical function having the minimum physical function aggregated value and the I/O information processed by the command to the minimum physical function aggregated value corresponding to the physical function having the minimum physical function aggregated value.

7. The method of claim 1,
wherein the submission queue selected from the plurality of submission queues has a lowest submission queue aggregated value in the aggregated value table.

8. The method of claim 7,
wherein the entry of the aggregated value table is an entry of the submission queue storing the lowest submission queue aggregated value, and
wherein the entry of the aggregated value table is updated by adding a product of weight information corresponding to the one of the first physical function and the second physical function which accessed the submission queue selected from the plurality of submission queues and the I/O information processed by the command to the lowest submission queue aggregated value of the entry of the submission queue.

9. The method of claim 1, further comprising:
determining which of the first physical function and the second physical function performs garbage collection;
increasing, by a predetermined value, a weight value of a weight information corresponding to a physical function which is determined as performing the garbage collection.

10. The method of claim 1, further comprising:
setting a token management table including first token information of the first physical function based on the first performance information and second token information of the second physical function based on the second performance information,
wherein each of the first token information and the second token information includes a reference time and a token number;
writing, after performing the command, a completion for the proceed command in a completion queue corresponding to the command;
transmitting, based on the token management table, an interrupt to a host corresponding to a physical function associated with the command from among the first host and the second host.

11. The method of claim 10, wherein the transmitting the interrupt comprises:
determining whether a value of a token number of a physical function associated with the command from among the first physical function and the second physical function is greater than a reference value; and
in response to the determining the value of the token number as being greater than the reference value, transmitting the interrupt to the host,
wherein, when the number of tokens is not greater than the reference value, the interrupt is not transmitted to the host corresponding to the physical function associated with the command.

12. The method of claim 11, further comprising:
refilling a token number of the first physical function at the token management table, when a reference time of the first physical function is elapsed; and refilling a token number of the second physical function at the token management table, when a reference time of the second physical function is elapsed.

13. The method of claim 1, wherein each of the first and second physical functions is a nonvolatile memory express (NVMe) controller configured to communicate with the first and second hosts through at least one PCI-express interface based physical port.

14. A storage device comprising:
a nonvolatile memory device; and
a storage controller connected to a host including a first host and a second host and configured to control the nonvolatile memory device, wherein the storage controller includes:
a first NVMe controller configured to process a first command from a first group of submission queues of the first host;
a second NVMe controller configured to process a second command from a second group of submission queues of the second host; and
a performance managing circuit configured to:
set a first weight value and a second weight value respectively associated with the first NVMe controller and the second NVMe controller based on first performance information received from the first and second performance information received from the second host,
select a submission queue of a plurality of submission queues including the first group of submission queues and the second group of submission queues based on an aggregated value table including a plurality of entries, each of the plurality of entries being associated with a corresponding submission queue of the plurality of submission queues and updated based on a weight value of the corresponding submission queue and input/output (I/O) information processed by a command previously fetched from the corresponding submission queue, and
process a command from the submission queue selected from the plurality of submission queues.

15. The storage device of claim 14,
wherein the first group of submission queues includes a first submission queue and a second submission queue,
wherein the second group of submission queues includes a third submission queue and a fourth submission queue, and
wherein the aggregated value table further includes:
a first submission queue aggregated value aggregated based on I/O information of at least one command, which is received from the first submission queue and is then processed, and the first weight value;
a second submission queue aggregated value aggregated based on I/O information of at least one command, which is received from the second submission queue and is then processed, and the first weight value;
a third submission queue aggregated value aggregated based on I/O information of at least one command, which is received from the third submission queue and is then processed, and the second weight value; and
a fourth submission queue aggregated value aggregated based on I/O information of at least one command, which is received from the fourth submission queue and is then processed, and the second weight value.

16. The storage device of claim 15,
wherein the submission queue is a submission queue having a least value of the first to fourth submission queue aggregated values.

17. The storage device of claim 15,
wherein the aggregated value table further includes:
a first physical function aggregated value is updated based on I/O information of at least one command processed through the first NVMe controller and the first weight value; and
a second physical function aggregated value is updated based on I/O information of at least one command processed through the second NVMe controller and the second weight value.

18. The storage device of claim 17,
wherein the performance managing circuit is further configured to:
select an NVMe controller having a least physical function aggregated value from among the first and second NVMe controllers;
select a submission queue having a least submission queue aggregated value from a group of submission queues corresponding to the NVMe controller having the least physical function aggregated value as the submission queue.

19. The storage device of claim 15,
wherein the first and second NVMe controllers respectively communicate with the first and second hosts through at least one PCI-express interface based physical port.

20. An operation method of a storage device which is configured to communicate with a plurality of hosts, the method comprising:

receiving a plurality of performance information from the plurality of hosts;

setting a weight value of each of the plurality of hosts based on respective performance information of the plurality of performance information;

fetching a command from a first host of the plurality of hosts, based on an aggregated value table;

processing the fetched command; and updating the aggregated value table based on input/output (I/O) information of the processed command and a weight value of the first host, wherein the aggregated value table includes a plurality of aggregated values, each of the plurality of aggregated values being previously updated by a product of I/O information of a previously processed command and a weight value of a host, from which the previously processed command was fetched, of the plurality of hosts.

* * * * *